United States Patent
Higuchi et al.

(10) Patent No.: US 7,576,947 B2
(45) Date of Patent: Aug. 18, 2009

(54) FLUID DYNAMIC PRESSURE BEARING DEVICE, SPINDLE MOTOR PROVIDED WITH FLUID DYNAMIC PRESSURE BEARING DEVICE, AND RECORDING DISK DRIVE DEVICE

(75) Inventors: Fumiyasu Higuchi, Kitasaku-gun (JP); Naoyuki Kondo, Kitasaku-gun (JP); Toshimitsu Horiuchi, Kitasaku-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 310 days.

(21) Appl. No.: 11/666,741

(22) PCT Filed: Nov. 30, 2005

(86) PCT No.: PCT/IB2005/003621

§ 371 (c)(1),
(2), (4) Date: May 18, 2007

(87) PCT Pub. No.: WO2006/061684

PCT Pub. Date: Jun. 15, 2006

(65) Prior Publication Data

US 2008/0130168 A1 Jun. 5, 2008

(30) Foreign Application Priority Data

Dec. 10, 2004 (JP) ............................. 2004-358324

(51) Int. Cl.
*H02K 7/08* (2006.01)
(52) U.S. Cl. .................................. 360/99.08
(58) Field of Classification Search .................. None
See application file for complete search history.

(56) References Cited

U.S. PATENT DOCUMENTS

| | | | |
|---|---|---|---|
| 7,021,829 B2 * | 4/2006 | Tamaoka | 384/112 |
| 2003/0202721 A1* | 10/2003 | Obara | 384/107 |
| 2003/0230944 A1 | 12/2003 | Aiello | |
| 2004/0008911 A1 | 1/2004 | Oelsch | |
| 2005/0286167 A1* | 12/2005 | Yonei et al. | 360/99.08 |

FOREIGN PATENT DOCUMENTS

| | | |
|---|---|---|
| JP | A 8-331796 | 12/1996 |
| JP | B2 2937833 | 6/1999 |
| JP | A 2000-197309 | 7/2000 |

* cited by examiner

*Primary Examiner*—Mark Blouin
(74) *Attorney, Agent, or Firm*—Oliff & Berridge, PLC

(57) ABSTRACT

A fluid dynamic pressure bearing device includes a first capillary seal (50) formed between an outer circumferential surface of a bearing member 20 and an internal circumferential surface of a seal member (30). A second capillary seal portion (60) is formed between an outer circumferential surface of a shaft member (10) and a protrusion hole (31) of the seal member (30). A ventilation hole (32a) is formed in a substantially intermediate portion of a side wall of the seal member. A lubricant holding gap (73) is formed between an inner surface of a top wall (31) of the seal member (30) and the upper end surface of the bearing member (20). Leakage of lubricant (80) is suppressed by action of the capillary seal portions (50, 60), and the liquid surface is positioned in the first capillary seal portion (50) above the ventilation hole (32a), whereby extra lubricant (80) is filled in the first capillary seal portion (50) and the lubricant holding gap (73).

24 Claims, 12 Drawing Sheets

FLUID DYNAMIC PRESSURE BEARING DEVICE, SPINDLE MOTOR PROVIDED WITH FLUID DYNAMIC PRESSURE BEARING DEVICE, AND RECORDING DISK DRIVE DEVICE

BACKGROUND

This invention relates to a fluid dynamic pressure bearing device in which a shaft member is supported by a bearing member, using dynamic pressure of a lubricant, such that relative rotation between the shaft member and bearing member is possible. This invention may also relate to a spindle motor provided with the fluid dynamic pressure bearing device, and to a recording disk drive device provided with the fluid dynamic pressure bearing device. This invention relates particularly to improvement of a capillary seal portion that suppresses lubricant filled in the fluid dynamic pressure bearing device from leaking to the outside, using capillarity.

Recently, in recording disk drive devices such as a magnetic disk or an optical disk used for a computer, there is a strong demand for higher density in addition to miniaturization, thinness, and lightness. Because of this, there is a strong demand for increasing the rpm (revolutions per minute) and improving rotation precision of a spindle motor used for disk rotation. In order to meet such a demand, instead of using a conventional ball bearing as a bearing device for a spindle motor, a fluid dynamic pressure bearing device is used that rotatably supports a rotation shaft by a bearing member, using fluid dynamic pressure of a lubricant.

SUMMARY

In fluid dynamic pressure bearing devices, there has been a problem that lubricant held between a rotation shaft and a bearing member would rise up toward an opening formed by an upper end portion of the rotation shaft and the bearing member and leak therefrom, due to factors such as: volume changes such as expansion and contraction of the lubricant according to temperature changes, or expansion displacement or the like of parts dimensions of the rotation shaft, bearing member, or the like; internal movement due to a pump effect or the like when a rotation operation begins and stops; and centrifugal force, dynamic pressure effect, or the like during rotation. When the lubricant amount is reduced, the required fluid dynamic pressure is not generated. Thus, a support force of the rotation shaft decreases, and there is a possibility that seizure could be generated as the rotation shaft and the bearing member contact each other. Additionally, there was a possibility that the recording disk drive device could be contaminated by leaked lubricant, whereby damage of the recording disk drive device or erasure of a recording may occur. Furthermore, even if lubricant does not leak to the outside, if the lubricant amount gradually decreases due to natural evaporation, seizure is ultimately generated. Therefore, the amount of extra lubricant that can be filled inside the bearing device, in addition to the lubricant amount filling the bearing gap, is one of the important elements that determined the life duration of a fluid dynamic pressure bearing device. Because of this, a small fluid dynamic pressure bearing device that can hold a large amount of lubricant, and from which lubricant does not easily evaporate or leak to the outside, is desired.

In order to solve this type of problem, a fluid dynamic pressure bearing device has been proposed in which a cross section of a gap that is in communication with the outside is formed in a tapered shape, whereby more extra lubricant can be held and a capillary seal portion is provided which suppresses lubricant from leaking to the outside, using capillarity.

For example, in a fluid dynamic pressure bearing device shown in FIGS. 16A and (B), a capillary seal portion 500 that can hold extra lubricant is constituted at an opening of a gap between a rotation shaft 501 and a bearing member 502, by forming a taper surface 502a extending upward in the axial direction at a predetermined angle of inclination on the inner circumferential surface of a bearing member 502 (for example, see Japanese Patent 2937833 (JP-B-2937833) (FIG. 1)).

Furthermore, in a fluid dynamic pressure bearing device shown in FIG. 17, between an upper end surface 601a of the bearing member 601 and a thin plate 602 that faces the upper end surface 601a, a capillary seal portion 600 that can hold extra lubricant is constituted by forming a cross-sectionally tapered gap extending outward in the radial direction (for example, see Japanese Laid-Open Patent Application 8-331796 (JP-A-8-331796) (FIGS. 1 and 3, Abstract)).

Furthermore, in a fluid dynamic pressure bearing device shown in FIG. 18, by forming a thrust bearing portion 701 between an upper end surface of a bearing member 704 and a lower surface of an upper wall portion 703a of a rotor hub 703, there is no need for a thrust plate which is a conventional means that supports a load in a thrust direction. By forming a tapered gap extending downward in the axial direction between an inner circumferential surface of an annular protrusion 703b extending down from the upper wall portion 703a of the rotor hub 703 and an outer circumferential surface of a bearing member 704, a capillary seal portion 700 is constituted which can hold extra lubricant (for example, see Japanese Laid-Open Patent Application 2000-197309 (JP-A-2000-197309) (FIG. 2, Abstract)). Furthermore, symbols 703c and 704c of the figure are a thrust dynamic pressure generating groove and a radial dynamic pressure generating groove, respectively.

However, there have been problems in the above-mentioned conventional capillary seal portions. That is, the capillary seal portion 500 shown in FIGS. 16A and (B) is constituted so as to widen toward an opening formed in an axial direction, so lubricant can be easily evaporated therefrom, and trash and dust can easily contaminate the lubricant. Therefore, the life duration of the fluid dynamic pressure bearing device and the function of the lubricant deteriorate. Furthermore, if rapid movement of the lubricant is generated by a shock or the like, nothing encloses the lubricant and suppresses the lubricant from leaking. In addition, because the capillary seal portion 500 is formed in an axial direction, the capillary seal portion 500 must be made long in the axial direction to hold a large amount of lubricant in the capillary seal portion 500. Therefore, the overall length of the fluid dynamic pressure bearing device becomes that much larger, and it is difficult to reduce the size of the bearing device. If it is attempted to increase the lubricant holding capacity without making the entire length of the fluid dynamic pressure bearing device long, then the capillary seal portion 500 is made long in the axial direction, and the length of a radial dynamic pressure groove 503 is shortened. However, in this case, the dynamic pressure force in the radial direction becomes small, so bearing rigidity deteriorates.

In the capillary seal portion 600 shown in FIG. 17, the lubricant holding space of is limited to a tapered gap at the upper end surface 601a of the bearing member 601. Thus, when the diameter of the bearing member 601 is made small to make the fluid dynamic pressure bearing device smaller, the lubricant holding capacity becomes small. Furthermore, the gap is open over substantially the entire circumference of the outer circumferential surface of the thin plate 602, so lubricant can easily evaporate. Furthermore, upon performing various confirmation testing at the time of the invention of this application, when lubricant was held by forming a liquid surface within the tapered gap at the upper end surface of the bearing member of FIG. 17, the liquid surface was not stably and uniformly formed. Therefore, it was found that there is a possibility that the life duration of the fluid dynamic pressure bearing device of FIG. 17 may be negatively affected.

In the capillary seal portion 700 shown in FIG. 18, the gap at the upper end surface of the bearing member 704 forms a thrust bearing portion. Thus, the gap that holds extra lubricant is limited to the gap at the outer circumferential surface of the bearing member 704. Furthermore, the capillary seal portion 700 shown in FIG. 18 is constituted by including the rotor hub 703, which is a motor part, so the fluid dynamic pressure bearing device cannot be independently completed. Therefore, quality of the fluid dynamic pressure bearing device cannot be tested independently prior to assembling the motor. However, a rotation torque value of the fluid dynamic pressure bearing device is proportional to a current consumption value of a spindle motor using the fluid dynamic pressure bearing device, so it is preferable that the rotation torque value be measured and confirmed to be a desired torque value before assembling the fluid dynamic pressure bearing device into a motor.

Furthermore, a rotor hub is more expensive than a thrust plate. Thus, if quality of a fluid dynamic pressure bearing device cannot be tested before assembling a motor, if problems occur, the cost of abandoning the device is significant. Furthermore, the lower surface of the upper wall portion 703a of the rotor hub 703 is one of the surfaces constituting the thrust dynamic pressure bearing portion 701. Therefore, it is necessary to make the entire upper wall portion 703a of the rotor hub 703 rigid, and so it is difficult to make the rotor hub 703 thinner.

In addition, if a fluid dynamic pressure bearing device provided with the capillary seal portion 700 is applied to a recording disk device, the following problem occurs. That is, when a fluid dynamic pressure bearing device is mounted to a recording disk device, a center pin-type structure is generally used, in which a female screw hole is provided in a rotation shaft of the fluid dynamic pressure bearing device, and a clamp member of the recording disk device, a rotor hub, and the fluid dynamic pressure bearing device are integrally fixed by tightening a male screw into this female screw hole. However, in the center pin-type structure, depending on the rotor hub material, the dimension of the hub in the thickness direction, or the like, there is a case that the rotor hub may be deformed due to the pressing force of the clamp member against a magnetic disk when the disk is mounted. If this type of deformation occurs, the rotor hub is flexed, the axial direction dimension of the micro gap regulated by the thrust bearing portion is not uniform in a diameter direction, and it is difficult to obtain a stable shaft support force in the thrust bearing portion. Because of this, the motor rotation precision deteriorates. In addition, problems such as abrasion, damage, seizure, or the like of the bearing surface occur as the lower surface of the rotor hub constituting the thrust bearing portion and the upper end surface of the bearing member contact each other, and durability and reliability of the motor deteriorates.

Meanwhile, aluminum alloy, glass, resin, or the like is typically used as a material of a magnetic disk that is rotatably driven by a motor provided with a fluid dynamic pressure bearing device. Among these materials, aluminum alloy is often used, which is less expensive than glass. To suppress warping of the magnetic disk due to the temperature fluctuation, it is necessary to use a material with a thermal expansion coefficient that is substantially the same as that of the magnetic disk material, as the material of a hub on which a magnetic disk is mounted and integrally rotated with the hub. In the case of an aluminum alloy magnetic disk, aluminum alloy, which is the same material, is also used for the hub. However, an aluminum alloy rotor hub that is suitable to an aluminum alloy magnetic disk is relatively soft, so abrasion and damage of the bearing surface can be easily generated as the lower surface of the rotor hub and the upper end surface of the bearing member contact each other when rotation is stopped and a dynamic pressure in the thrust direction is not generated.

This invention reflects on the above-mentioned conventional problems. An object of exemplary embodiments of this invention is to provide a fluid dynamic pressure bearing device in which a capillary seal portion can be constituted independently by a fluid dynamic pressure bearing device, in which miniaturization can be achieved, and in which the life duration is improved due to the combined effect of suppressing contamination within a recording disk drive device, suppressing lubricant from leaking to the outside, and increasing the amount of extra lubricant that can be held. An object of some embodiments is to provide a spindle motor and a recording disk drive device equipped with the fluid dynamic pressure bearing device.

A fluid dynamic pressure bearing device according to some embodiments of this invention is provided with a shaft member; a bearing member that supports the shaft member; a seal member with a top wall, the top wall having a protrusion hole through which an upper end portion of the shaft member protrudes, the seal member being arranged to cover an upper end portion of the bearing member; a closure member that closes a lower end portion of the bearing member; and a bearing gap including dynamic pressure grooves formed between the shaft member and the bearing member, and between the shaft member and the closure member, respectively. A radial dynamic pressure groove is formed in either an outer circumferential surface of the shaft member or an inner circumferential surface of the bearing member, and generates a dynamic pressure force that receives a load in a radial direction. A first thrust dynamic pressure groove is formed in either a downward-facing surface of the shaft member or an upper surface of the closure member, and generates a dynamic pressure force that receives a load in a thrust direction. A lubricant holding gap is formed between an upper end surface of the bearing member and an inner surface of the top wall of the seal member. A first capillary seal portion is formed between an outer circumferential surface of the bearing member and an inner circumferential surface of the seal member. The first capillary seal portion forming a cross-sectionally tapered shape that widens progressing downward. A second capillary seal portion is formed between the outer circumferential surface of the shaft member and an inner circumferential surface of the protrusion hole. The bearing gap, the second capillary seal portion, the lubricant holding gap, and the first capillary seal portion are in communication with each other, and occupied by lubricant. The seal member may include a ventilation hole formed in a side wall of the seal member. The ventilation hole is positioned below a liquid surface of the lubricant that occupies the first capillary seal portion. A through-hole may pass through the bearing member in an axial direction, and establish communication between the bearing gap and the lubricant holding gap.

In exemplary embodiments of a fluid dynamic pressure bearing device according to this invention, a first capillary seal portion which forms a cross-sectionally taper shape that widens progressing downward in the axial direction is formed, continuous with the lubricant holding gap, between the opposing surfaces of the outer circumferential surface of the bearing member and the seal member. Thus, due to capillarity, a force acts on the lubricant within the first capillary seal portion, drawing the lubricant upward in the axial direction, so the lubricant can be suppressed from leaking to the outside of the fluid dynamic pressure bearing device. Therefore, it is possible to suppress the reduction of the amount of lubricant held, and contamination within a recording disk drive device provided with the fluid dynamic pressure bearing device can be suppressed. In addition, the liquid surface of the lubricant is positioned within the first capillary seal portion, so the interface of the lubricant can be stably and uniformly formed in the step of filling the lubricant. Therefore, extra lubricant filled in the space between the first capillary seal portion and the lubricant holding gap can be reliably supplied to the bearing portion.

Furthermore, unlike the embodiment that uses a rotor hub of a conventional spindle motor, the first capillary seal portion can be independently constituted by a fluid dynamic pressure bearing device. Therefore, the problem that was generated in the fluid dynamic pressure bearing device using a conventional rotor hub can be solved. In addition, the lubricant holding gap is formed between the opposing surfaces of the upper end-surface of the bearing member and the seal member, so not only the first capillary seal portion but also the entire upper end surface of the bearing member can be used as a lubricant holding space. Therefore, unlike a conventional capillary seal portion formed at the opening of the gap between the outer circumferential surface of a shaft member and the inner circumferential surface of a bearing member, the capillary seal portion does not need to be extended in the axial direction. Additionally, the amount of lubricant held can be significantly increased without enlarging the diameter of the bearing member, which is unlike the conventional capillary seal portion formed between a thin plate and the upper end surface of the bearing member. Therefore, life duration and miniaturization of the fluid dynamic pressure device can be improved.

In addition, the first capillary seal portion can use a ventilation hole as an opening portion in communication with atmospheric air, so the opening area of the capillary seal portion can be made smaller than that of a conventional device. Thus, evaporation, leakage, and contamination of the lubricant can be suppressed. Therefore, diminishing of the amount of lubricant that can be held, and contamination within a recording disk drive device provided with the fluid dynamic pressure bearing device, can be further suppressed.

Here, various structures can be used in order to improve the lubricant holding functions of the fluid dynamic pressure bearing device of this invention. For example, the second capillary seal portion may form a cross-sectionally tapered shape that widens progressing upward. In this state, due to capillarity, a force is generated in the lubricant within the second capillary seal portion by which the lubricant is drawn upward in the axial direction, so leakage of the lubricant to the outside of the device can be further suppressed.

In the above-mentioned state, it is preferable that on the top wall of the seal member, an annular protrusion is formed protruding upward from a periphery of the protrusion hole. The second capillary seal portion is formed between the opposing surfaces of the protrusion hole of the seal member, the inner circumferential surface of the annular protrusion, and the outer circumferential surface of the shaft member. In this state, movement of lubricant within the second capillary seal portion in the axial direction is further allowed, so leakage of lubricant to the outside can be further suppressed.

The lubricant holding gap may form a cross-sectionally tapered shape that widens progressing outward in the radial direction. In this state, due to capillarity, a force is generated in the lubricant within the lubricant holding gap, by which the lubricant is drawn inward in the radial direction. Thus, a force by which the lubricant is drawn upward in the axial direction is generated in the lubricant within the first capillary seal portion, which is in communication with the lubricant holding gap, so leakage of the lubricant to the outside of the device can be further suppressed.

Furthermore, three or more protrusions may be formed on the inner surface of the top wall of the seal member, and axial direction positioning of the seal member may be accomplished by contacting the protrusions against the upper end surface of the bearing member. In this state, generation of size irregularities in the surface direction of the lubricant holding gap can be suppressed, so the lubricant holding capacity can be further stabilized.

It is preferable that circumferential grooves are respectively formed, facing each other, in the outer circumferential surface of the bearing member and the inner circumferential surface of the seal member, and that the circumferential grooves are located below the liquid surface of the first capillary seal portion and above the ventilation hole of the seal member. In this case, an oil repellant agent can be coated on the outer circumferential surface of the bearing member and/or on the inner circumferential surface of the seal member, below the circumferential groove. In this state, both the circumferential groove and the oil repellant agent can further suppress leakage of the lubricant from the ventilation hole. Furthermore, by using the circumferential groove as a mark, the portion to be coated by the oil repellant agent can be reliably determined, and the oil repellant agent can be easily coated.

The ventilation hole may be a notch formed extending downward to the lower end surface of the cylindrical portion of the seal member, and may serve as a window for visual confirmation of the position of the liquid surface of the lubricant. In this state, the amount of lubricant present can be visually confirmed through the ventilation hole.

It is preferable that a hollow case member is provided, of which the overall length is shorter than that of the bearing member. The bearing member protrudes from an upper end portion of the case member, and the bearing member can be engaged with the inner circumferential surface of the case member. In this state, the bearing member and the closure member are engaged with the case member, so the shapes of the respective members can be simplified, and the processing becomes easy. Additionally, by having the respective members standardized and storing them in advance, various combinations become possible, and even if a design change in the bearing device occurs, the design change can be promptly responded to. Thus, the production cost can be decreased.

In the above-mentioned state, axial direction positioning of the seal member may be accomplished by bringing the seal member, which engages with the outer circumferential surface of the upper end portion of the bearing member, into contact with the upper end surface of the case member. Alternatively, a step portion may be formed on the outer circumferential surface of the upper end portion of the case member, and axial direction positioning of the seal member may be accomplished by bringing the seal member, which engages with the outer circumferential surface of the upper end portion of the case member, into contact with the step portion. In this state, generation of size irregularities in the surface direction of the lubricant holding gap can be further suppressed, so the lubricant holding capacity can be further stabilized.

Furthermore, when the seal member is engaged with the upper end portion outer circumferential surface of the bearing member, it is preferable that a first adhesive-retention portion is formed between the outer circumferential surface of the bearing member and the inner circumferential surface of the upper end portion of the case member, and that a second adhesive-retention portion is formed between the outer circumferential surface of the bearing member and the inner circumferential surface of the lower end portion of the seal member. Adhesive is filled in the first and second retention portions, and the case member and the seal member are respectively fixed to the bearing member by the adhesive.

In the above-mentioned state, when the seal member and the case member are engaged with the bearing member, and adhesive is applied therebetween, entrance of the adhesive to the inner circumferential surface of the bearing member can be suppressed. Furthermore, attachment and flowing out of adhesive to portions other than the intended filling portion can be suppressed.

A circumferential groove can be formed on the outer circumferential surface of the bearing member. The first retention portion can be formed between the circumferential groove and an inner circumferential surface of the upper end portion of the case member, and the second retention portion can be formed between the circumferential groove and an inner circumferential surface of the lower end portion of the seal member.

In the above-mentioned state, in addition to the above-mentioned effects, the adhesive filling region can be simplified, and the first and second retention portions can be formed adjacent to each other. Furthermore, adhesive can be filled in all at once, and the filling operation becomes easy.

The case member can be constituted by a cylindrical portion that is integral with the closure member. Furthermore, the case member can be formed by drawing processing or extrusion processing. The shaft member may include a flange portion. In addition, a spacer member can be arranged between the bearing member and the closure member. The spacer member forms an engaging gap that engages with the flange portion of the shaft member. The spacer can also be standardized and stored in advance, so a design change can be promptly responded to.

On the lower end surface of the bearing member and/or the upper end surface of the flange portion, which face each other, a second thrust dynamic pressure groove can be formed, which generates a dynamic pressure that receives a load in the thrust direction. In this state, a dynamic pressure in the thrust direction generated at the lower surface of the flange portion is balanced due to the dynamic pressure in the thrust direction generated at the top surface of the flange portion, so the shaft member is not overfloated and can be stably rotated.

An exemplary spindle motor according to this invention is provided with a base, a stator that is fixed to the base, a rotor that is provided with a rotor hub and a rotor magnet that is engaged with the rotor hub and generates a rotation magnetic field in cooperation with the stator, and a fluid dynamic pressure bearing device that supports rotation of the rotor. The fluid dynamic pressure bearing device may be any of the above-mentioned fluid dynamic pressure bearing devices provided with the first thrust groove, and the rotor is attracted by a magnetic force in the axial direction opposite to the direction of the thrust dynamic pressure generated in the first thrust dynamic pressure groove within the fluid dynamic pressure bearing device.

In addition, when the above-mentioned fluid dynamic pressure bearing device is provided with the second thrust dynamic pressure groove, the rotor does not need to be attracted by a magnetic force.

An exemplary recording disk drive device according to this invention is provided with a recording disk, a recording head that writes and/or reads information with respect to the recording disk, and a spindle motor, as described above, that rotatingly drives the recording disk.

These and other features, objects and/or advantages are described in or apparent from the following detailed description of exemplary embodiments.

BRIEF DESCRIPTION OF THE DRAWINGS

FIG. 1A is a side cross-sectional view of the fluid dynamic pressure bearing device, and FIG. 1B is a side elevation view of the fluid dynamic pressure bearing device viewed in the direction of arrow A of FIG. 1A.

FIG. 2A is a side cross-sectional view of the fluid dynamic pressure bearing device. FIG. 2B is a side elevation view of the fluid dynamic pressure bearing device viewed in the direction of arrow A of FIG. 2A.

FIG. 10A is a top surface view of a top wall of the seal member. FIG. 10B is a cross-sectional view along line A-A of FIG. 10A.

FIG. 16 is a side cross-sectional view showing a schematic structure of a conventional example of a capillary seal portion of a fluid dynamic pressure bearing device.

DETAILED DESCRIPTION OF EMBODIMENTS

(A) Fluid Dynamic Pressure Bearing Device

(1) First Embodiment

Figure 1A:
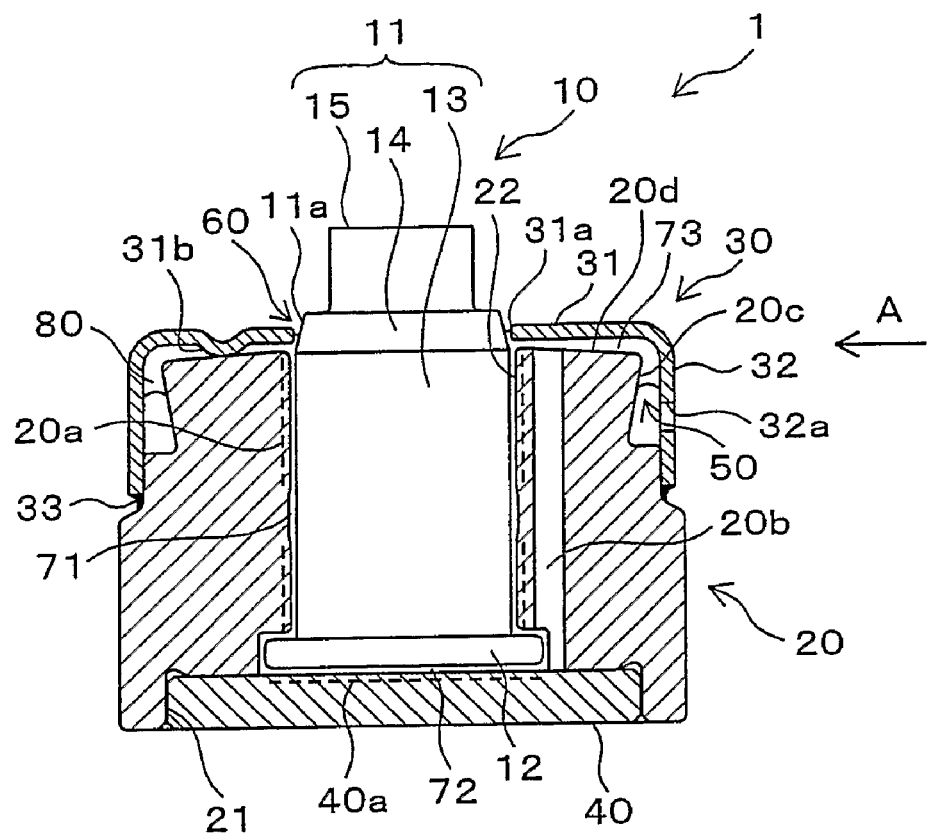
FIGS. 1A and 1B show a schematic structure of a fluid dynamic pressure bearing device related to a first embodiment of this invention.
Figure 1B:
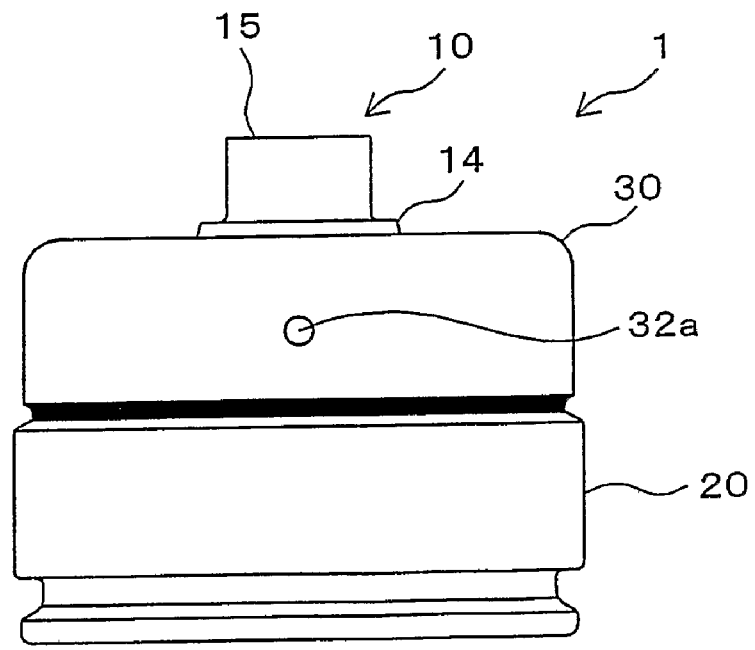

The following explains a first embodiment of this invention with reference to the drawings. FIG. 1 shows a schematic structure of a fluid dynamic pressure bearing device related to the first embodiment of this invention. FIG. 1A is a side cross-sectional view of a fluid dynamic pressure bearing device 1, and FIG. 1B is a side elevation view of the fluid dynamic pressure bearing device 1 viewed in the direction of arrow A of FIG. 1A.

First, the overall structure of an exemplary fluid dynamic pressure bearing device 1 will be explained. The fluid dynamic pressure bearing device 1 is provided with a hollow, substantially cylindrical bearing member 20 that rotatably supports a rotation shaft (shaft member) 10. A cylindrical seal member 30 is engaged with the bearing member 20 so as to cover the upper end portion of the bearing member 20. The seal member 30 is provided with a top wall 31 and a cylindrical portion 32 that is integral with the top wall 31. In the top wall 31 of the seal member 30, a protrusion hole 31a is formed, through which the upper end portion of the rotation shaft 10 protrudes. A ventilation hole 32a is formed in the cylindrical portion 32 of the seal member 30. A closure member 40 is engaged with a lower opening portion 21 of the bearing member 20.

A first capillary seal portion 50 is formed between the bearing member 20 and the inner circumferential surface of the cylindrical portion 32. The first capillary seal portion 50 has a tapered cross section, which expands downward in the axial direction. A second capillary seal portion 60 is formed between the inner circumferential surface of the protrusion hole 31a of the seal member 30 and a tapered surface 11a of the rotation shaft 10, described below. The second capillary seal portion 60 has a tapered cross section, which expands upward in the axial direction. Radial dynamic pressure grooves 20a are formed on the inner circumferential surface of the bearing member 20, and a thrust dynamic pressure groove 40a (first thrust dynamic pressure groove) is formed on the top surface of the closure member 40. Furthermore, a through-hole 20b is formed so as to go through both end surfaces of the bearing member 20 in the axial direction.

A radial bearing gap 71 is formed between the rotation shaft 10 and the bearing member 20. A thrust bearing gap 72 is formed between the rotation shaft 10 and the closure member 40. The bearing gaps 71, 72 are micro gaps. A lubricant holding gap 73 is formed between the inner side surface of the top wall 31 of the seal member 30 and the upper end surface of the bearing member 20. The lubricant holding gap 73 has a tapered cross section that expands outward in the radial direction. The through-hole 20b, the radial bearing gap 71, the thrust bearing gap 72, the lubricant holding gap 73, the first capillary seal portion 50, and the second capillary seal portion 60 are in communication with each other, and the lubricant 80 is continuously filled therebetween. Furthermore, the lubricant is drawn in due to capillarity, and the lubricant is reliably supplied from the first capillary seal portion 50 to the bearing gap via the lubricant holding gap 73, so the gap dimension in the radial direction in the first capillary seal portion 50 is set larger than the gap dimension in the axial direction of the lubricant holding gap 73.

Lubricant may be filled in the fluid dynamic pressure bearing device of the first embodiment using the following filling method, for example. That is, in an incomplete fluid dynamic pressure bearing device in which members other than the seal member 30 are assembled, the gaps within the bearing member 20 are made substantially a vacuum. Then, a predetermined amount of lubricant 80 is supplied to the upper end surface of the bearing member 20, using a dispenser. After the opening 22 of the radial bearing gap 71 and the through-hole 20b are covered by lubricant, if the outside of the bearing member 20 is returned to atmospheric pressure, the lubricant 80 is drawn into the gaps due to the pressure difference between the outside and the inside of the bearing member 20. The lubricant then continuously fills the bearing gaps 71, 72, and the through-hole 20b. At this stage, the lubricant 80 that is required for filling the first capillary seal portion 50, the lubricant holding gap 73, and the second capillary seal portion 60 is held at the upper end surface of the bearing member 20 in a state in which a liquid surface of the lubricant is raised due to surface tension. Here, as the seal member 30 is engaged with the bearing member 20 and is pressed down, as the gap between the inner side surface of the top wall 31 of the seal member 30 and the upper end surface of the bearing member 20 becomes smaller, the lubricant 80 held on the upper end surface of the bearing member 20 is pressed and spreads out in the radial direction, and the liquid surface ultimately moves to the first capillary seal portion 50. Then, in a state in which the seal member 30 is positioned in the axial direction, the liquid surface is formed at the same position, in the axial direction, along the entire circumference of the first capillary seal portion 50. Thus, a stable, uniform liquid surface of the lubricant 80 can be formed. Furthermore, this filling method may be used with the same effect in any of the other embodiments described below.

The following explains various parts of the fluid dynamic pressure bearing device 1. The rotation shaft 10 is provided with a shaft main body portion 11 and a flange portion 12 formed under the shaft main body portion 11. The shaft main body portion 11 is provided with a large-diameter cylindrical portion 13, a tapered portion 14, and a small-diameter cylindrical portion 15, in order from the bottom, and these portions 13-15 are integral with each other. In the tapered portion 14, a tapered surface 11a is formed, of which the diameter reduces progressing upward in the axial direction. The lower end of the tapered surface 11a is connected to the upper end of the large-diameter cylindrical portion 13. Additionally, the diameter of the upper end of the tapered surface 11a is larger than the diameter of the small-diameter cylindrical portion 15.

The bearing member 20 forms a hollow, substantially cylindrical bearing member. At the bottom of the bearing member 20, a lower opening portion 21 is formed, which engages the closure member 40. At the upper side of the bearing member 20, an upper opening portion 22 is formed, through which the small-diameter cylindrical portion 15 and the tapered portion 14 of the rotation shaft 10 protrude. On the inner circumferential surface of the bearing member 20, radial dynamic pressure grooves 20a are formed. A through-hole 20b is formed which goes through both end surfaces of the bearing member 20 in the axial direction. The through-hole 20b enables lubricant circulation, and relieves the internal pressure difference that is generated between the respective bearing gaps and the lubricant holding gap 73 at the upper end portion of the bearing member 20 when the shaft is rotated. A radial bearing gap 71 is formed between the inner circumferential surface of the bearing member 20 and the rotation shaft 10. The radial bearing gap 71 has a shape corresponding to the outer circumferential surface of the large-diameter cylindrical portion 13 of the shaft main body portion 11. A radial bearing portion is constituted by the radial dynamic pressure grooves 20a, the radial bearing gap 71, and the lubricant 80 filled in the radial bearing gap 71. In the radial bearing portion, because of the operation of the radial dynamic pressure groove 20a, a dynamic pressure of the lubricant that receives a load in the radial direction is generated. The above-mentioned radial and thrust dynamic pressure grooves may have a shape currently known in the art in the context of dynamic pressure grooves, or any later-developed shape.

A tapered surface 20c is formed on the upper portion of the outer circumferential surface of the bearing member 20. The diameter of the tapered surface 20c reduces progressing downward in the axial direction from the upper end edge of the bearing member 20. The first capillary seal portion 50 formed between the inner circumferential surface of the cylindrical portion 32 of the seal member 30 and the bearing member 20 is tapered in cross-section because of the tapered surface 20c. On the upper end surface of the bearing member 20, a tapered surface 20d is formed that tapers downward, progressing outward in the axial direction from the protrusion hole 31a. The lubricant holding gap 73 formed between the inner surface of the top wall 31 of the seal member 30 and the upper end surface of the bearing member 20 has a tapered cross-section because of the tapered surface 20d. The liquid surface of the lubricant 80 is positioned in the first capillary seal portion 50. Therefore, the liquid surface is stably and uniformly formed, and a sufficient amount of lubricant 80 is continuously held in the first capillary seal portion 50 and the lubricant holding gap 73.

Figure 10A:
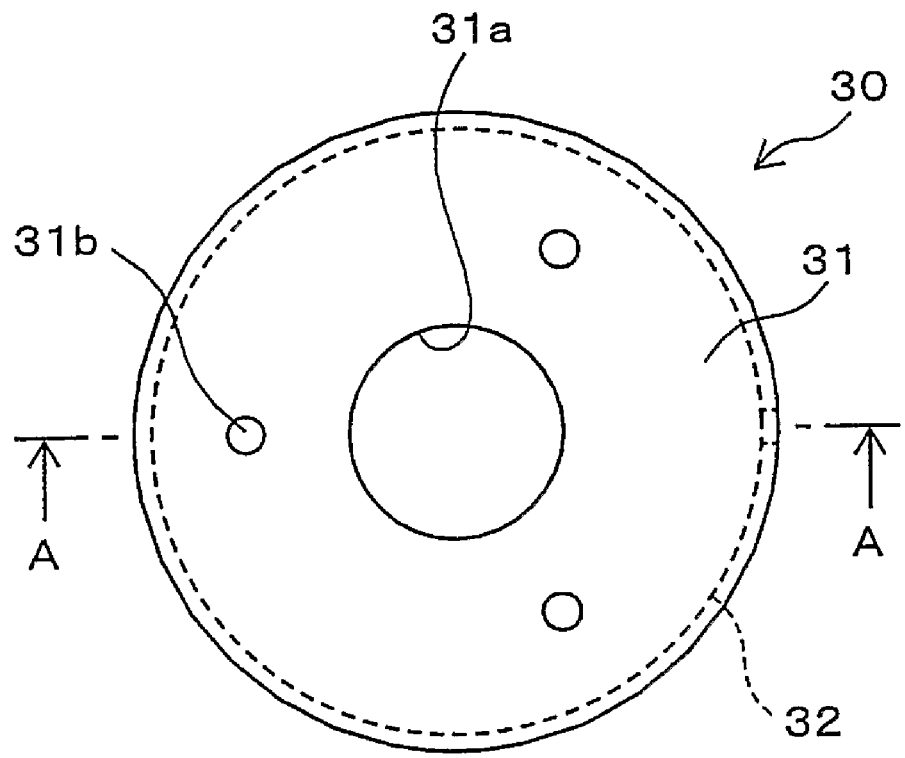
FIGS. 10A and 10B show a schematic structure of a seal member arranged in the fluid dynamic pressure bearing device of FIG. 1.
Figure 10B:
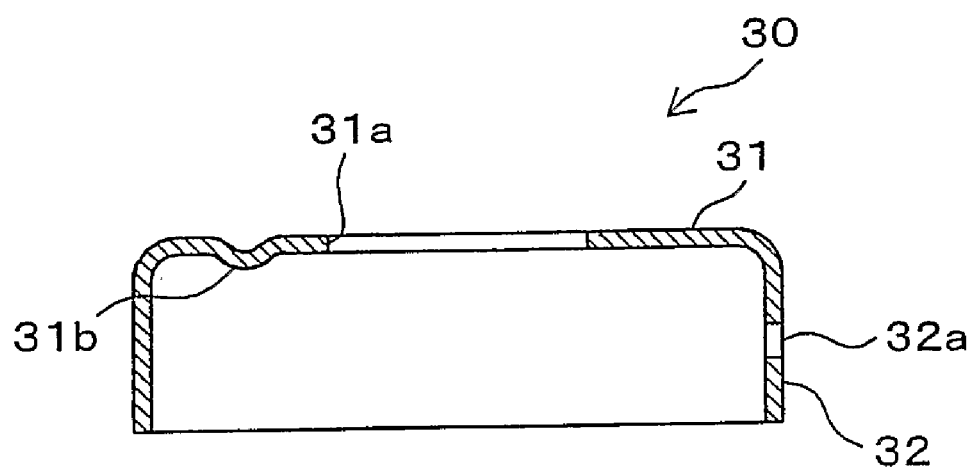

FIG. 10 shows a schematic structure of the seal member 30 shown in FIG. 1. In the following explanation, the same symbols as in FIG. 1 are used in FIG. 10. FIG. 10A is a top surface view of the top wall 31 of the seal member 30, and FIG. 10B is a cross-sectional view taken along line A-A of FIG. 10A. The seal member 30 may be formed by drawing processing and forms a cylindrical shape, in which the top wall 31 and the cylindrical portion 32 are integrated. In the top wall 31, the protrusion hole 31a is formed in the center, and three protrusions 31b that contact the upper end surface of the bearing member 20 are formed on the inner surface of the top wall 31. The protrusions 31b have a function of positioning the seal member 30 in the axial direction by contacting the upper end surface of the bearing member 20. Thus, the first capillary seal portion 50 and the lubricant holding gap 73 are formed at specified dimensions substantially without irregularities. A ventilation hole 32a may be formed approximately at the center of the cylindrical portion 32. The ventilation hole 32a establishes communication between the liquid surface of the lubricant 80 of the first capillary seal portion 50 and the atmosphere.

The seal member 30 is positioned such that the inner surface of the top wall 31 faces the upper end surface of the bearing member 20, and the upper end portion of the tapered portion 14 and the small-diameter cylindrical portion 15 of the rotation shaft 10 go through the protrusion hole 31a. The ventilation hole 32a is positioned below the upper end surface of the bearing member 20. The seal member 30 is engaged with the bearing member 20 so as to cover the upper end portion of the bearing member 20, and is fixed with adhesive 33.

The closure member 40 is engaged with the lower opening portion 21 of the bearing member 20. On the upper surface of the closure member 40, the thrust dynamic pressure groove 40a is formed, which faces the lower surface of the flange portion 12 of the rotation shaft 10. Between the upper surface of the closure member 40 and the lower surface of the flange portion 12, the thrust bearing gap 72 is formed. A thrust bearing portion is constituted by the thrust dynamic pressure groove 40a, the thrust bearing gap 72, and the lubricant 80 that fills the thrust bearing gap 72. When the rotation shaft 10 is rotated, a dynamic pressure of lubricant that receives a load in the thrust direction is generated in the thrust bearing portion by the thrust dynamic pressure groove 40a.

The first capillary seal portion 50 communicates with the lubricant holding gap 73 and is formed between the tapered surface 20c of the upper part of the outer circumferential surface of the bearing member 20 and the inner circumferential surface of the seal member 30, which faces the tapered surface 20c. The first capillary seal portion 50 forms a cross-sectionally tapered capillary structure that widens progressing downward in the axial direction. The liquid surface of the lubricant 80 in the first capillary seal portion 50 is positioned above the ventilation hole 32a of the cylindrical portion 32, in the axial direction.

The second capillary seal portion 60 is in communication with the radial bearing gap 71 and the lubricant holding gap 73, respectively, and is formed between the inner circumferential surface of the protrusion hole 31a of the seal member 20 and the tapered surface 11a of the rotation shaft 10. The second capillary seal portion 60 forms a cross-sectionally tapered capillary structure that widens progressing upward in the axial direction.

The lubricant 80 is made to occupy the through-hole 20b, the radial bearing gap 71, the thrust bearing gap 72, the lubricant holding gap 73, the first capillary seal portion 50, and the second capillary seal portion 60, which are in communication with each other. The lubricant 80 is circulated to the lubricant holding gap 73 from the radial bearing gap 71 and the thrust bearing gap 72. Due to capillarity, a force is generated that draws the lubricant in the first capillary seal portion 50 upward in the axial direction. In particular, in the first capillary seal portion 50, by balancing the surface tension of the lubricant 80 with atmospheric pressure via the ventilation hole 32a, the liquid surface position of the lubricant 80 is held above the ventilation hole 32a, in the axial direction. Because of this effect of the first capillary seal portion 50, the lubricant 80 is suppressed from leaking to the outside. Furthermore, in the second capillary seal portion 60, due to capillarity, a force is generated by which the lubricant 80 is drawn downward in the axial direction. Because of this effect of the second capillary seal portion 60, the lubricant 80 is suppressed from leaking to the outside.

In the fluid dynamic pressure bearing device 1 of the first embodiment, the first capillary seal portion 50, which forms a cross-sectionally tapered shape that widens progressing downward in the axial direction, is formed between the outer circumferential surface of the bearing member 20 and the inner circumferential surface of the seal member 30, and is in communication with the lubricant holding gap 73. Thus, due to capillarity, in the first capillary seal portion 50, a force is generated that draws the lubricant 80 downward in the axial direction, and the lubricant 80 is suppressed from leaking to the outside of the fluid dynamic pressure bearing device. Therefore, diminishing of the amount of the lubricant 80 held can be suppressed, and contamination within a recording disk drive device provided with the fluid dynamic pressure bearing device 1 can be suppressed. Furthermore, because the liquid surface of the lubricant 80 can be positioned within the first capillarity seal portion 50, the liquid surface of the lubricant 80 can be stably, uniformly formed. Therefore, extra lubricant 80 held in the first capillary seal portion 50 and the lubricant holding gap 73 can be reliably supplied to the radial bearing portion and the thrust bearing portion.

Furthermore, according to the first embodiment, the first capillary seal portion 50 is constituted by a bearing device independently, without using a rotor hub of a conventional spindle motor. Thus, the problem that was generated in the bearing device using a conventional rotor hub can be solved. In addition, the lubricant holding gap 73 is in communication with the first capillary seal portion 50 and is formed between the upper end surface of the bearing member 20 and the inner surface of the top wall 31 of the seal member 30. Thus, the first capillary seal portion 50 and the entire upper end surface of the bearing member 20 can be used as a lubricant holding space. As a result, the amount of extra lubricant 80 that can be held can be increased without making the capillary seal portion longer in the axial direction, which is unlike a conventional capillary seal portion formed at the opening of a gap between the outer circumferential surface of the rotation shaft and the inner circumferential surface of the bearing member, and without making the diameter of the bearing member large, which is unlike a conventional capillary seal portion formed between a thin plate and the upper end surface of the bearing member. As the capacity for holding extra lubricant 80 increases, the time until the life of the bearing expires due to lubricant insufficiency because of natural evaporation of lubricant is extended. Therefore, the life duration of the fluid dynamic pressure bearing device 1 can be improved, and the fluid dynamic pressure bearing device 1 can be made smaller.

Furthermore, in the fluid dynamic pressure bearing device 1 of the first embodiment, in the second capillary seal portion 60, due to capillarity, a force is generated that draws the lubricant 80 downward in the axial direction, so the lubricant can be suppressed from leaking to the outside of the device.

Furthermore, the first capillary seal portion 50 can use the ventilation hole 32a as an opening portion that is in communication with the atmosphere, so the opening area of the capillary seal portion can be made smaller than in a conventional device. Therefore, evaporation, leakage, and contamination of the lubricant 80 can be suppressed. Thus, diminishing of the amount of lubricant 80 that can be held can be further suppressed, and contamination within a recording disk drive device provided with the fluid dynamic pressure bearing device 1 can be further suppressed.

In addition, the lubricant holding gap 73 forms a cross-sectionally tapered shape that tapers outward in the radial direction, so in the lubricant holding gap 73, due to capillarity, a force acts on the lubricant 80, drawing the lubricant inward in the radial direction. A force further acts on the lubricant 80 within the first capillary seal portion 50, which is in communication with the lubricant holding gap 73, and draws the lubricant upward in the axial direction. Thus, leakage of the lubricant 80 to the outside of the device can be effectively suppressed.

Furthermore, by contacting the protrusions 31b against the upper end surface of the bearing member 20 and positioning the seal member 30 in the axial direction, the first capillary seal portion 50 and the lubricant holding gap 73 can be formed according to specified dimensions without irregularities.

(2) Second Embodiment

Figure 2A:
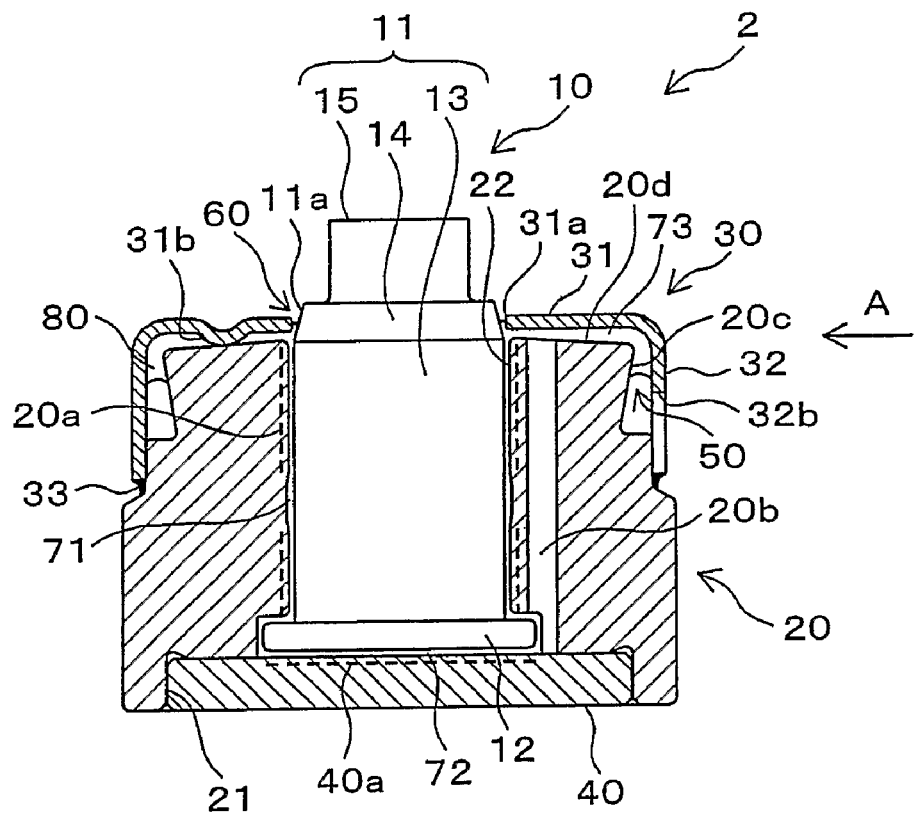
FIGS. 2A and 2B show a schematic structure of a fluid dynamic pressure bearing device related to a second embodiment of this invention.
Figure 2B:
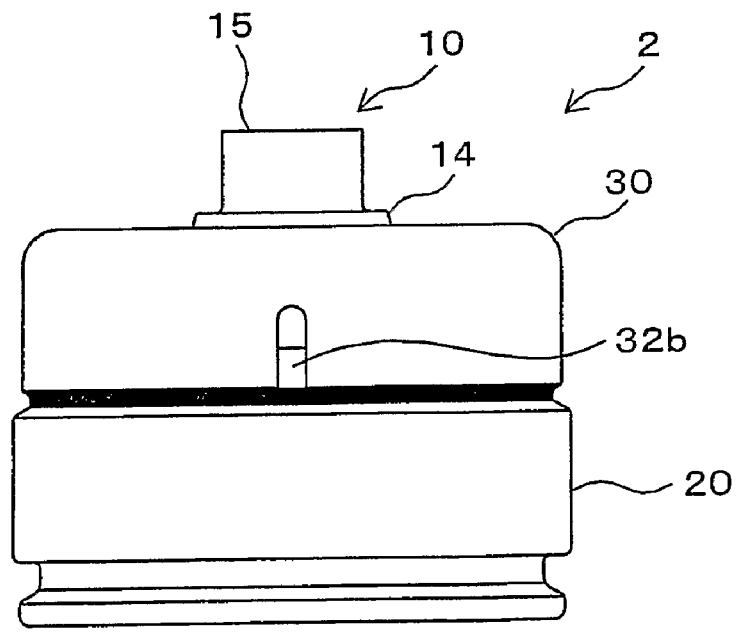

The following explains a second embodiment of this invention with reference to FIG. 2. FIG. 2 shows a schematic structure of a fluid dynamic pressure bearing device 2 related to the second embodiment of this invention. FIG. 2A is a side cross-sectional view of the fluid dynamic bearing device 2, and FIG. 2B is a side elevation view of the fluid dynamic pressure bearing device 2 viewed in the direction of arrow A of FIG. 2A. Furthermore, in the following second through eleventh embodiments, the same symbols are used for parts that are the same as in the first embodiment, and the explanation of the structure and the operation of those parts is omitted. In the fluid dynamic pressure bearing device 2 of the second embodiment, instead of the ventilation hole 32a of the first embodiment, a notch 32b is formed. The notch 32b is formed at a lower end of the cylindrical portion 32, and the position of the upper end of the notch 32b matches the position of the ventilation hole 32a of the first embodiment. In the second embodiment, the amount of lubricant 80 can be visually confirmed via the notch 32b.

(3) Third Embodiment

Figure 3:
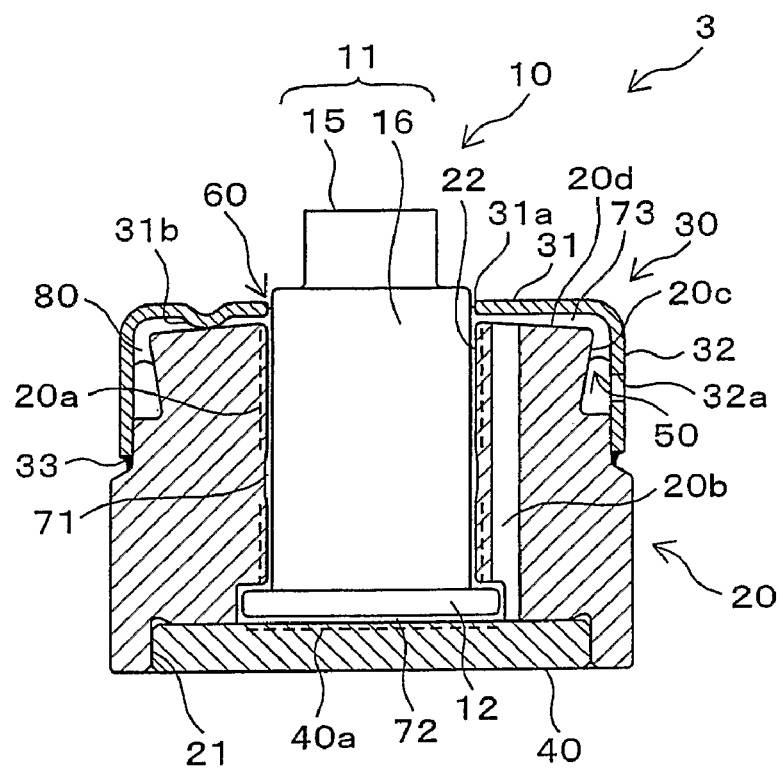
FIG. 3 is a side cross-sectional view showing a schematic structure of a fluid dynamic pressure bearing device related to a third embodiment of this invention.

The following explains a third embodiment of this invention with reference to FIG. 3. FIG. 3 is a side cross-sectional view showing a schematic structure of a fluid dynamic pressure bearing device 3 related to the third embodiment of this invention. In the fluid dynamic pressure bearing device 3 of the third embodiment, the shaft main body portion 11 is constituted by the small-diameter cylindrical portion 15 and a large-diameter cylindrical portion 16 only, and the tapered portion 14 of the first embodiment is omitted. That is, in the third embodiment, the large-diameter cylindrical portion 16 of the shaft main body portion 11 has a shape such that the position of its upper end matches the position of the upper end of the tapered portion 14 of the first embodiment. Thus, polishing processing of the tapered portion 14 is omitted, and the rotation shaft 10 is easily processed.

(4) Fourth Embodiment

Figure 4:
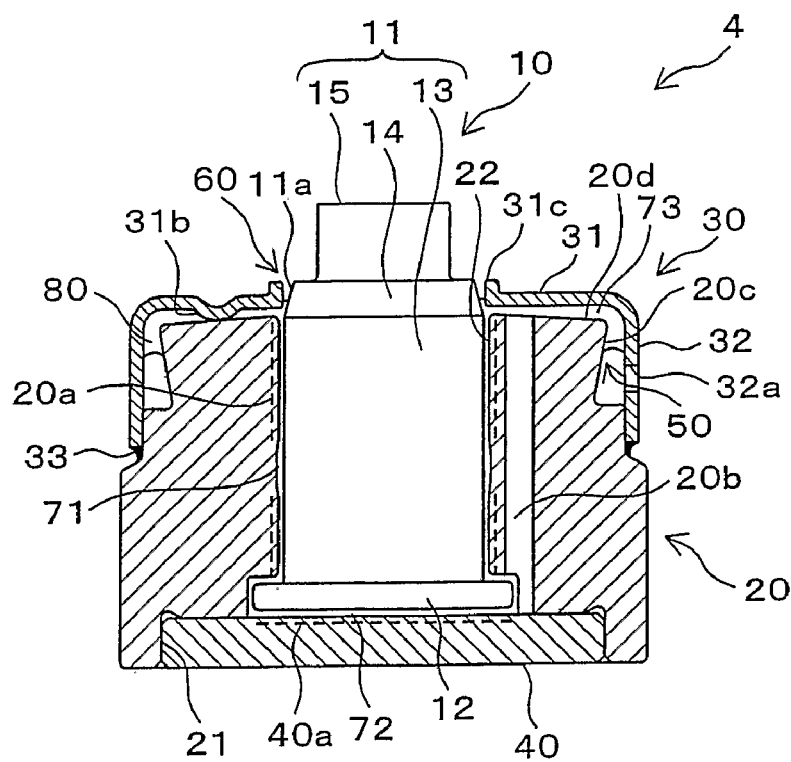
FIG. 4 is a side cross-sectional view showing a schematic structure of a fluid dynamic pressure bearing device related to a fourth embodiment of this invention.

The following explains a fourth embodiment of this invention with reference to FIG. 4. FIG. 4 is a side cross-sectional view showing a schematic structure of a fluid dynamic, pressure bearing device 4 related to the fourth embodiment of this invention. In the fourth embodiment, on the seal member 30 of the first embodiment, an annular protrusion 31c is formed which protrudes upward along the inner periphery of the protrusion hole 31a. Thus, further movement of the lubricant 80 within the second capillary seal portion 60 in the axial direction is allowed, so leakage of the lubricant 80 to the outside can be further suppressed.

(5) Fifth Embodiment

Figure 5:
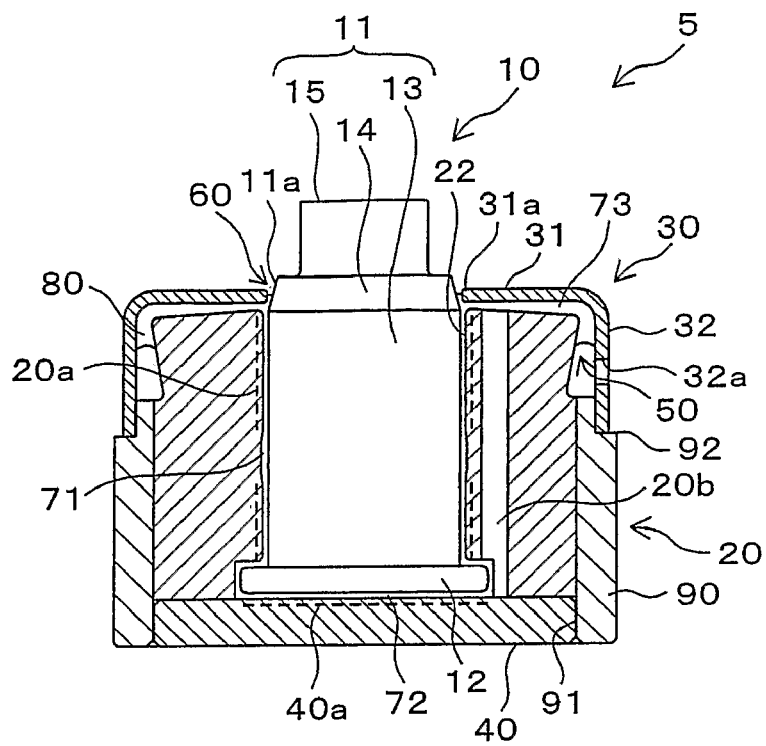
FIG. 5 is a side cross-sectional view showing a schematic structure of a fluid dynamic pressure bearing device related to a fifth embodiment of this invention.

The following explains a fifth embodiment of this invention with reference to FIG. 5. FIG. 5 is a side cross-sectional view showing a schematic structure of a fluid dynamic pressure bearing device 5 related to the fifth embodiment of this invention. The fluid dynamic pressure bearing device 5 of the fifth embodiment is provided with a hollow, substantially cylindrical case member 90, and the bearing member 20 is engaged with the inner circumferential surface of the case member 90. The case member 90 may be formed by cut-out processing. The closure member 40 is engaged with the lower opening portion 91 of the case member 90, and the upper end surface of the closure member 40 faces the lower surface of the flange portion 12. The seal member 30 is engaged with the upper end portion of the outer circumferential surface of the case member 90. By contacting the lower end surface of the cylindrical portion 32 of the seal member 30 against a step portion 92, the seal member 30 is positioned in the axial direction. By positioning the seal member 30 in the axial direction in this manner, the process of forming the protrusions 31*b* of the first embodiment can be omitted. Thus, without losing position accuracy of the seal member 30 in the axial direction, the seal member 30 can be easily processed. Furthermore, by having a structure in which the bearing member 20 and the closure member 40 are engaged with the case member 90, the shape of the respective members can be simplified, and the processing can be simplified. At the same time, by standardizing the respective members and storing them in advance, various combinations become possible. Even if there are design changes in the bearing device, they can be promptly responded to. Thus, the production cost can be reduced.

(6) Sixth Embodiment

Figure 6:
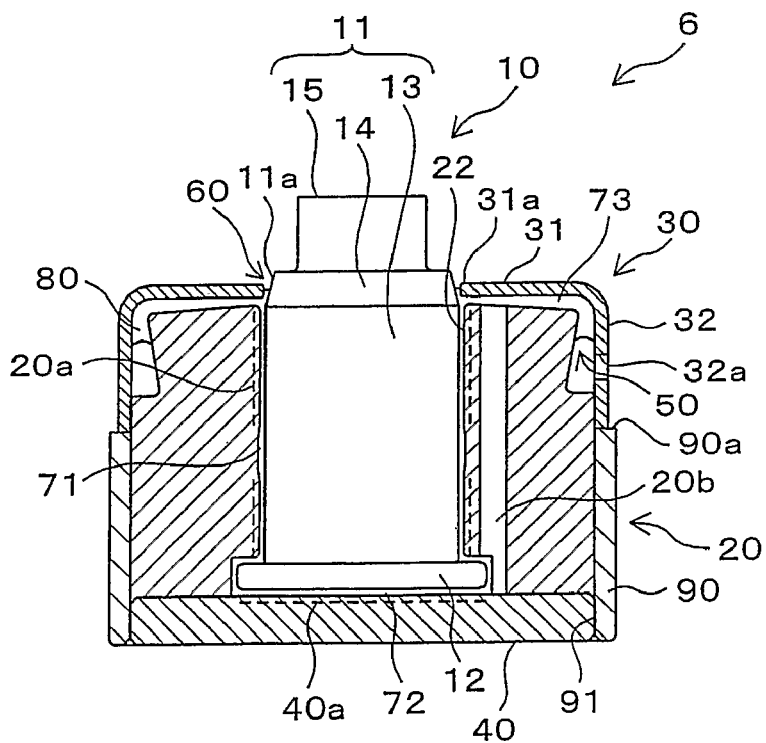
FIG. 6 is a side cross-sectional view showing a schematic structure of a fluid dynamic pressure bearing device related to a sixth embodiment of this invention.

The following explains a sixth embodiment of this invention with reference to FIG. 6. FIG. 6 is a cross-sectional view showing a schematic structure of a fluid dynamic pressure bearing device 6 related to a sixth embodiment of this invention. The sixth embodiment is a modified example of the fifth embodiment. In the fluid dynamic pressure bearing device 6 of the sixth embodiment, the step portion 92 of the case member 90 of the fifth embodiment is omitted, so the seal member 30 is engaged with the outer circumferential surface of the bearing member 20. The lower end surface of the cylindrical portion 32 of the seal member 30 contacts the upper end surface 90*a* of the case member 90, so the seal member 30 can be positioned in the axial direction. Thus, the case member 90 can be easily processed without losing position accuracy of the seal member 30 in the axial direction, and the process of forming the step portion 92 of the case member 90 of the fifth embodiment can be omitted.

(7) Seventh Embodiment

Figure 7:
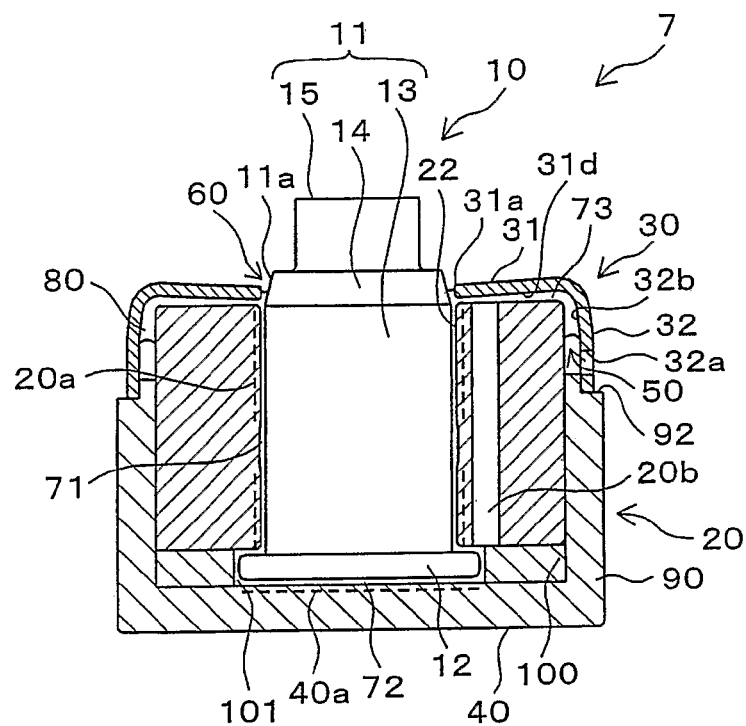
FIG. 7 is a side cross-sectional view showing a schematic structure of a fluid dynamic pressure bearing device related to a seventh embodiment of this invention.

The following explains a seventh embodiment of this invention with reference to FIG. 7. FIG. 7 is a side cross-sectional view showing a schematic structure of a fluid dynamic pressure bearing device 7 related to a seventh embodiment of this invention. The seventh embodiment is a modified example of the fifth embodiment. The fluid dynamic pressure bearing device 7 of the seventh embodiment is provided with a cylindrical case member 90 with a bottom. The case member 90 is a member in which the closure member 40 of the fifth embodiment and the case member 90 are integrally formed. Furthermore, the fluid dynamic pressure bearing device 7 is provided with a spacer 100 (spacer member) between the lower end surface of the bearing member 20 and the upper surface of the bottom wall of the case member 90, so that an engagement gap 101 is formed that engages with the flange portion 12 of the rotation shaft 10. Furthermore, in the fluid dynamic pressure bearing device 7, instead of the tapered surface 20*d* formed on the upper end surface of the bearing member 20 of the first embodiment, a tapered surface 31*d* is formed on the inner side surface of the top wall 31 of the seal member 30. The tapered surface 31*d* rises in the axial direction from the protrusion hole 31*a* outward in the radial direction. Furthermore, instead of the tapered surface 20*c* formed on the outer circumferential surface upper side of the bearing member 20 of the first embodiment, a tapered surface 32*b* is formed on the inner side surface of the cylindrical portion 32 of the seal member 30. The tapered surface 32*b* expands from the tapered surface 31*d* downward in the axial direction. In addition, on the inner side of the lower end portion of the cylindrical portion 32 that engages with the upper end portion of the outer circumferential surface of the case member 90, a cylindrical surface is formed that connects to the tapered surface 31*d*. By having this structure, the tapered surfaces and the step portion of the bearing member 20 are omitted, and the outer circumferential surface becomes a straight cylinder, so the processing becomes much easier. Furthermore, in the same manner as in the fifth embodiment, in addition to the case member 90 and the bearing member 20, by standardizing the spacer 100 and storing it in advance, design changes can be promptly responded to.

(8) Eighth Embodiment

Figure 8:
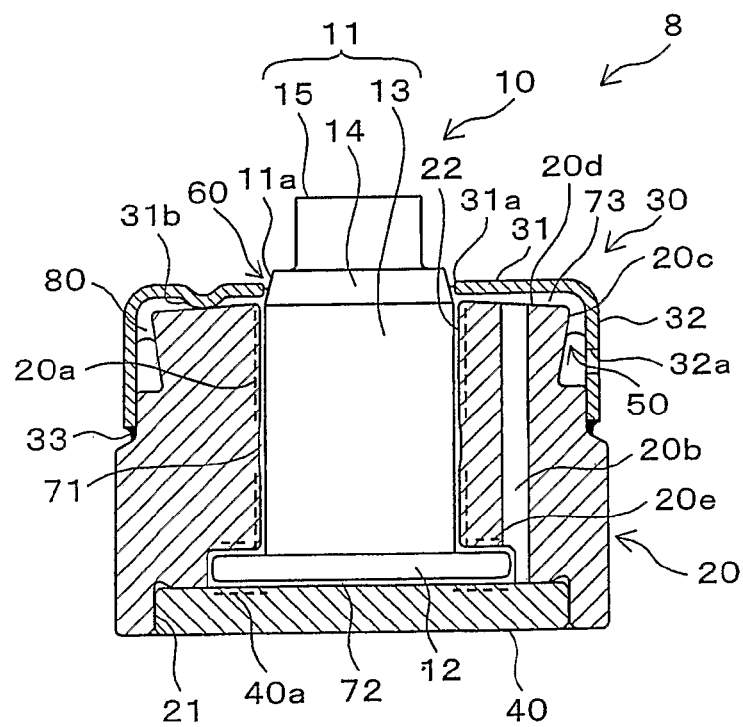
FIG. 8 is a side cross-sectional view showing a schematic structure of a fluid dynamic pressure bearing device related to an eighth embodiment of this invention.

The following explains an eighth embodiment of this invention with reference to FIG. 8. FIG. 8 is a side cross-sectional view showing a schematic structure of a fluid dynamic pressure bearing device 8 related to the eighth embodiment of this invention. The eighth embodiment is a modified example of the first embodiment. In the eighth embodiment, on the lower end surface of the bearing member 20 facing the upper surface of the flange portion 12 of the rotation shaft 10 of the first embodiment, a thrust dynamic pressure groove 20*e* is formed, which generates a dynamic pressure that receives a load in the thrust direction. In this state, the dynamic pressure in the thrust direction that is generated on the lower surface of the flange portion 12 is balanced by the dynamic pressure in the thrust direction generated on the upper surface of the flange portion 12, so the rotation shaft 10 is not overfloated, but can be stably rotated.

(9) Ninth Embodiment

Figure 9:
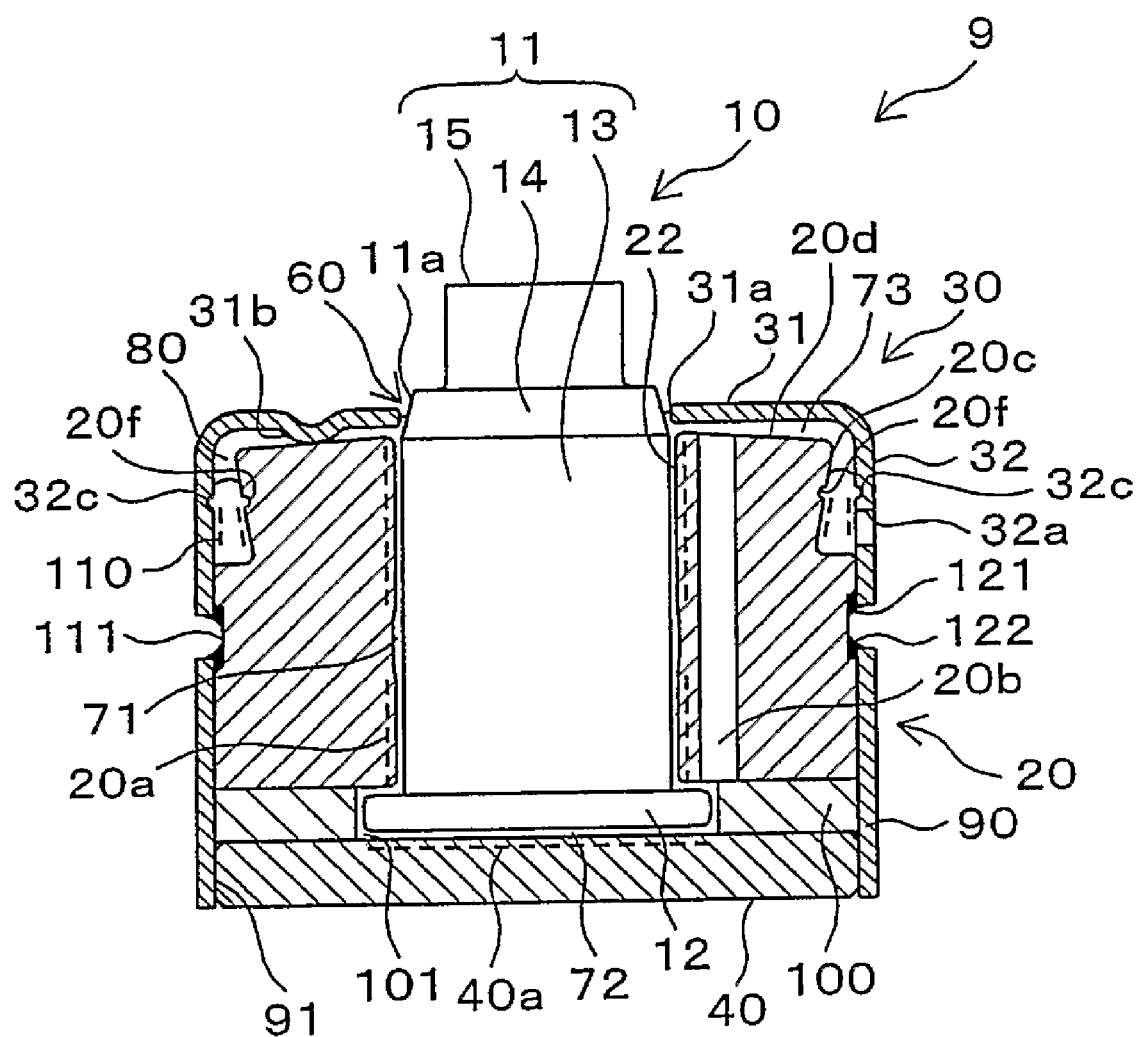
FIG. 9 is a side cross-sectional view showing a schematic structure of a fluid dynamic pressure bearing device related to a ninth embodiment of this invention.

The following explains a ninth embodiment of this invention with reference to FIG. 9. FIG. 9 is a side cross-sectional view showing a schematic structure of a fluid dynamic pressure bearing device 9 related to the ninth embodiment of this invention. The fluid dynamic pressure bearing device 9 is provided with the hollow, substantially cylindrical case member 90, and the bearing member 20 is engaged with the inner circumferential surface of the case member 90. The case member 90 is formed by drawing processing or extrusion processing, and therefore is cheaper than the case member of the fifth embodiment. The closure member 40 is engaged with the lower opening portion 91 of the case member 90, and the upper end surface of the closure member 40 faces the lower surface of the flange portion 12 of the rotation shaft 10. Furthermore, a spacer 100 is arranged between the lower end surface of the bearing member 20 and the upper end surface of the closure member 40 so that an engagement gap 101 is formed that engages with the flange portion 12.

Furthermore, on the outer circumferential surface of the bearing member 20 and the inner circumferential surface of the seal member 30, circumferential grooves 20f, 32c are formed facing each other. The circumferential grooves 20f, 32c are located below the liquid surface of the first capillary seal portion 50 and above the ventilation hole 32a of the seal member 30. Oil repellant agent 110 is coated on the outer circumferential surface of the bearing member 20 at a position below the circumferential groove 20f and on the inner circumferential surface of the seal member 30 at a position below the circumferential groove 32c. The oil repellant agent 110 is formed of, for example, a fluorine material.

A circumferential retention groove 111 (circumferential retention groove for adhesive) is formed on the outer circumferential surface of the bearing member 20. A first retention portion 121 for adhesive is formed between the outer circumferential surface of the upper end portion of the circumferential retention groove 111 and the inner circumferential surface of the end portion of the cylindrical portion 32 of the seal member 30. A second retention portion 122 for adhesive is formed between the outer circumferential surface of the lower end portion of the circumferential groove 111 and the inner circumferential surface of the upper end portion of the case member 90. The seal member 30 is fixed to the bearing member 20 by adhesive held in the first retention portion 121. The case member 90 is fixed to the bearing member 20 by adhesive held in the second retention portion 122.

In the ninth embodiment, even if the liquid surface of the lubricant 80 of the first capillary seal portion 50 rapidly moves downward due to a shock or vibration from outside, the lubricant 80 is effectively closed off by the circumferential grooves 20f, 32c and the oil repellant agent 110, and leakage of the lubricant 80 from the ventilation hole 32a can be further suppressed. Furthermore, the circumferential grooves 20f, 32c also play a role of marking a coating position when the oil repellant agent 110 is coated. Furthermore, by being positioned adjacent the first and second retention portions 121, 122, respectively, the circumferential grooves 20f, 32c can be formed on the outer circumferential surface, which is spaced relatively far apart from the opening portion 22 of the bearing member 20. Therefore, when adhesive is applied, the problem of getting adhesive on portions other than the intended portions, and the problem of entrance of adhesive to the inner circumferential surface from the opening portion 22 of the bearing member 20, can be effectively suppressed. Furthermore, the portion to be filled with adhesive can be simplified. Furthermore, adhesive can be injected all at once, so the adhesive can be easily injected.

(10) Tenth Embodiment (B) Spindle Motor

Figure 11:
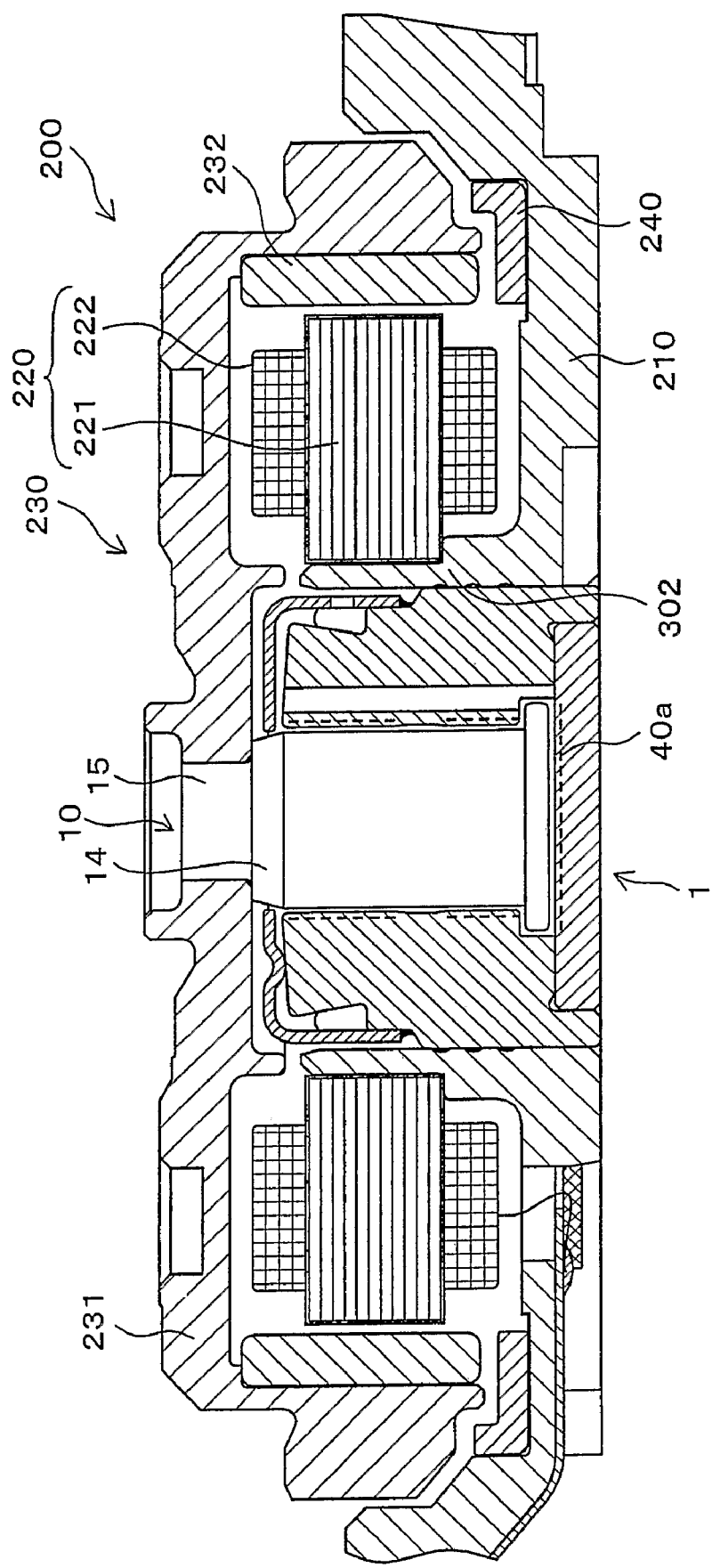
FIG. 11 is a side cross-sectional view showing a schematic structure of a spindle motor to which the fluid dynamic pressure bearing device of FIG. 1 is applied.

The following explains a spindle motor to which the fluid dynamic pressure bearing devices 1-9 of the first through ninth embodiments may be applied. FIG. 11 is a side cross-sectional view showing a schematic structure of a spindle motor 200 of a tenth embodiment to which the fluid dynamic pressure bearing device 1 of the first embodiment is applied. Furthermore, the spindle motor 200 is not limited to the fluid dynamic pressure bearing device 1 of the first embodiment, but the fluid dynamic pressure bearing devices 2-9 of the second through ninth embodiments also can be applied.

The spindle motor 200 is provided with a base 210. A boss portion 302 that protrudes upward is formed on the bottom portion of the base 210. A stator 220 in which a coil 222 is wound about a stator core 221 is fixed to the outer circumferential portion of the boss portion 302. Furthermore, the fluid dynamic pressure bearing device 1 is engaged with the inner circumferential surface of the boss portion 302, and a rotor 230 is supported by the fluid dynamic pressure bearing device 1 so as to be rotatable relative to the stator 220. The rotor 230 is provided with a rotor hub 231 and a rotor magnet 232 that is engaged with the rotor hub 231 and generates a rotation magnetic field in cooperation with the stator 220. The rotor hub 231 is engaged with the small-diameter cylindrical portion 15 of the rotation shaft 10 and contacts the end surface of the tapered portion 14, whereby the rotor hub 231 is positioned in the axial direction. An annular attraction plate 240 facing the lower end portion of the rotor magnet 232 via a small axial-direction gap may be fixed to the base 210. The attraction plate 240 has a function of attracting the entire rotor 230 by a magnetic force.

A screw hole, which is not depicted in detail, may be formed in the upper end of the rotation shaft 10, and a clamp member that fixes a recording disk may be screwed to this screw hole. Furthermore, a flexible wire board may be fixed to a surface of the base 210, and a rotor assembly body formed of the rotor hub 231, the rotor magnet 232, the rotation shaft 10, etc., may be rotated with respect to the stator 220 as a control current is supplied to the stator 220 by an output terminal of the wire board.

In the above-mentioned spindle motor 200, as the rotation shaft 10 is rotated, the rotor assembly body is attracted by a magnetic force in the axial direction opposite to a direction of the thrust dynamic pressure generated by the thrust dynamic pressure groove 40a within the fluid dynamic pressure bearing device 1. The thrust dynamic force generated by the thrust dynamic pressure groove 40a is balanced by a resultant of the magnetic force and gravity. The spindle motor 200 is not overfloated, but is stably supported.

When the fluid dynamic pressure bearing device 8 of the eighth embodiment is applied to the spindle motor 200, instead of the fluid dynamic pressure bearing device 1 of the first embodiment, the fluid dynamic pressure bearing device 8 is provided with a pair of thrust dynamic pressure bearings 20e, 40a that balance each other, so there is no need for arranging the attraction plate 240 that attracts the rotor 230 by a magnetic force. Therefore, fewer parts can be used.

(11) Eleventh Embodiment (C) Recording Disk Drive Device

Figure 12:
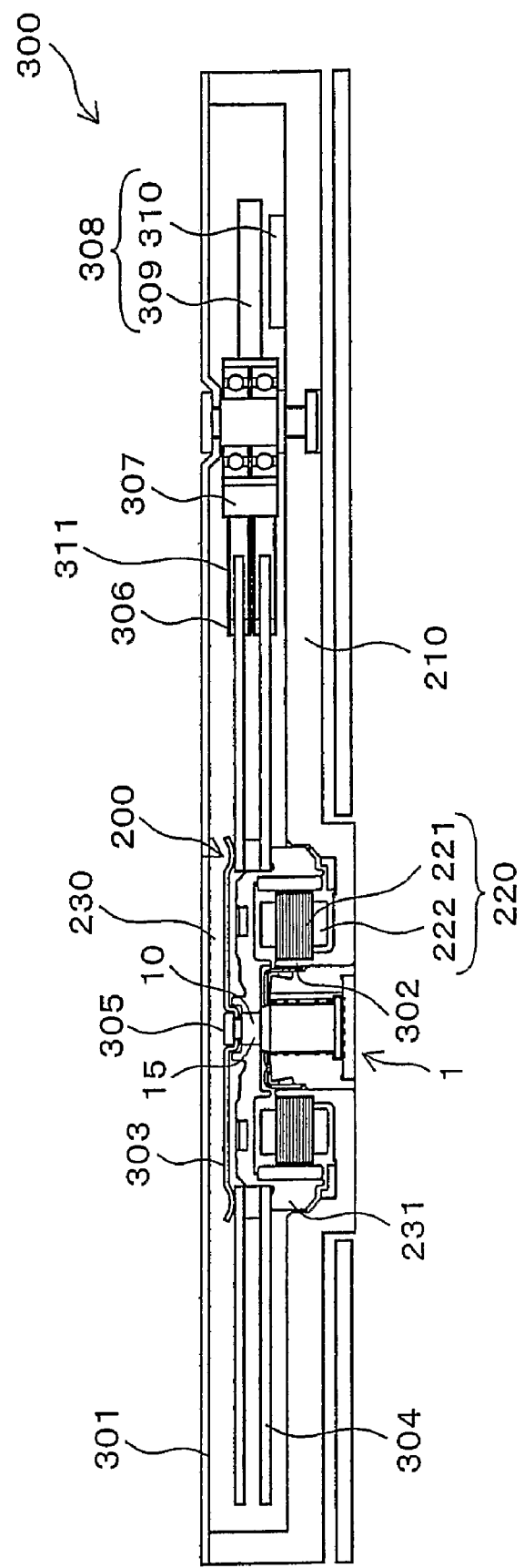
FIG. 12 is a side cross-sectional view showing a schematic structure of a magnetic disk drive device to which the spindle motor of FIG. 11 is applied.

The following explains a magnetic disk drive device 300 as a recording disk drive device to which the spindle motor 200 of the tenth embodiment is applied. FIG. 12 is a side cross-sectional view showing a schematic structure of the recording disk drive device 300 of the eleventh embodiment. In the magnetic disk drive device 300, a cover member 301 is arranged which forms a clean space with extremely little dust by sealing the space within the base 210 of the spindle motor 200 of the tenth embodiment. The cover member 301 and the base 210 form a casing of the magnetic disk drive device 300. Therefore, the base 210 constitutes both a part of the spindle motor 200 and a part of the casing of the magnetic disk drive device 300. The stator 220 of the spindle motor 200 and the main body portion of the spindle motor 200 including the rotor 230 are held within the casing of the magnetic disk drive device 300.

On the outer circumferential surface of the rotor hub 231, two magnetic disks 304 (recording disks) are mounted. The magnetic disks 304 are fixed to the rotor hub 231 by engaging a center pin 305 with the screw hole formed in the axial direction of the small-diameter cylindrical portion 15 of the rotation shaft 10, and fixing a clamp member 303. By so doing, the magnetic disks 304 are rotated along with the rotor hub 231. Furthermore, in the eleventh embodiment, two magnetic disks 304 are mounted to the rotor hub 231, but the number of magnetic disks is not limited to this.

In addition, the magnetic disk drive device 300 is provided with magnetic heads 306 (recording heads) that write and/or read information with respect to the magnetic disks 304, an arm 307 that supports the magnetic heads 306, and a voice coil motor 308 that moves the magnetic heads 306 and the arm 307 to a predetermined position. The voice coil motor 308 is provided with a coil 309 and a magnet 310 that is arranged opposite to the coil 309.

At an appropriate location on the base 210, the magnetic heads 306 are mounted to the tip end portion of a head stack assembly 311 fixed to the arm 307 that is rotatably supported. A pair of upper and lower magnetic heads 306 is arranged so as to sandwich each magnetic disk 304 and write and/or read information with respect to both surfaces of the magnetic disks 304. Furthermore, in the eleventh embodiment, there are two magnetic disks 304, so two pairs of recording heads 306 are arranged. In addition, in the eleventh embodiment, the spindle motor 200 is applied to the magnetic disk drive device 300, but this does not limit the invention. For example, the spindle motor 200 also can be applied to a recording disk drive device that drives a recording disk such as a CD or a DVD.

Some prototype embodiments are described below.

(1) Evaluation of the Liquid Surface State of Lubricant at the Bearing Member Upper End Surface Prototype Embodiment 1

Figure 13:
FIG. 13 is a photograph of a side surface of a fluid dynamic pressure bearing device of prototype embodiment 1 of this invention and shows a formation state of a liquid surface of lubricant.

Prototype embodiment 1 is a fluid dynamic pressure bearing device in which a transparent resin seal member is mounted so that a liquid surface state can be observed, and the same seal structure as in the above-described first embodiment of this invention is provided. Therefore, using the filling method explained in the first embodiment, gaps in the fluid dynamic pressure bearing device of embodiment 1 were filled with lubricant. That is, the internal portion of a bearing member of an incomplete fluid dynamic pressure bearing device was made to be substantially a vacuum in a state in which members other than the resin seal member were all assembled. A predetermined amount of lubricant was supplied to the upper end surface of the bearing member by using a dispenser, and lubricant covered the opening of the bearing gap and the through-hole. Then, the external portion of the bearing member was returned to atmospheric pressure, and lubricant was drawn into the bearing gap and the through-hole due to the difference between the external pressure and the internal pressure. At this stage, an amount of lubricant necessary to occupy the first capillary seal portion, the lubricant holding gap, and the second capillary seal portion was held on the upper end surface of the bearing member in a state in which the liquid surface was raised due to surface tension. Next, positioning in the axial direction was performed by engaging the seal member with the bearing member, and the liquid surface was formed at a predetermined position of the first capillary seal portion. The result is shown in FIG. 13. FIG. 13 is a photograph of a side surface of the dynamic pressure bearing device of prototype embodiment 1, and the liquid surface of lubricant between the bearing member and the seal member is shown. As shown in FIG. 13, in prototype embodiment 1, it was confirmed that the liquid surface of lubricant was formed at the same position, in the axial direction, along the entire circumference of the first capillary seal portion. Upon confirming the same state a plurality of times, the same result was obtained. That is, in prototype embodiment 1, a stable, uniform lubricant liquid surface was formed along the entire circumference of the first capillary seal portion.

Comparative Examples 1, 2

Figure 14:
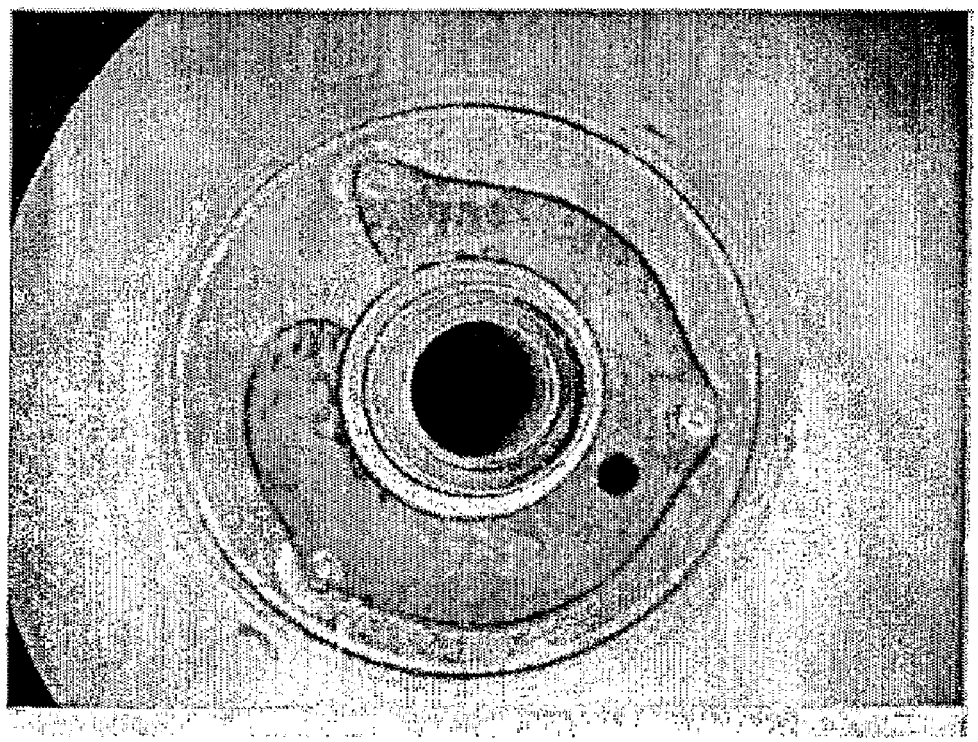
FIG. 14 is a photograph of a top surface of a fluid dynamic pressure bearing device of comparative example 1 of this invention and shows a formation state of a liquid surface of lubricant.
Figure 15:
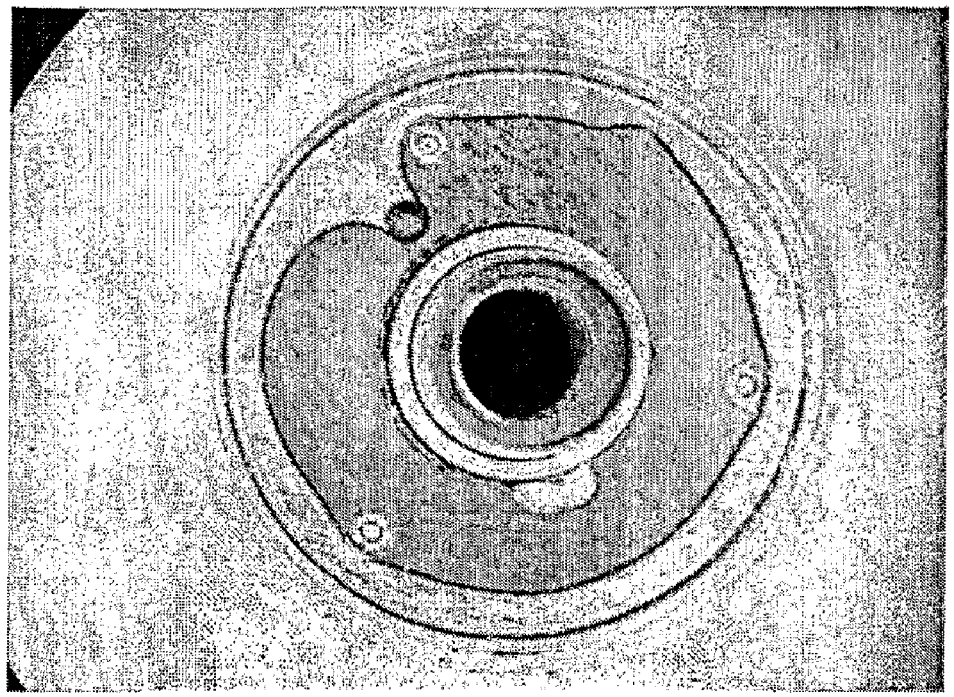
FIG. 15 is a photograph of a top surface of a fluid dynamic pressure bearing device of comparative example 2 of this invention and shows a formation state of a liquid surface of lubricant.
Figure 16A:
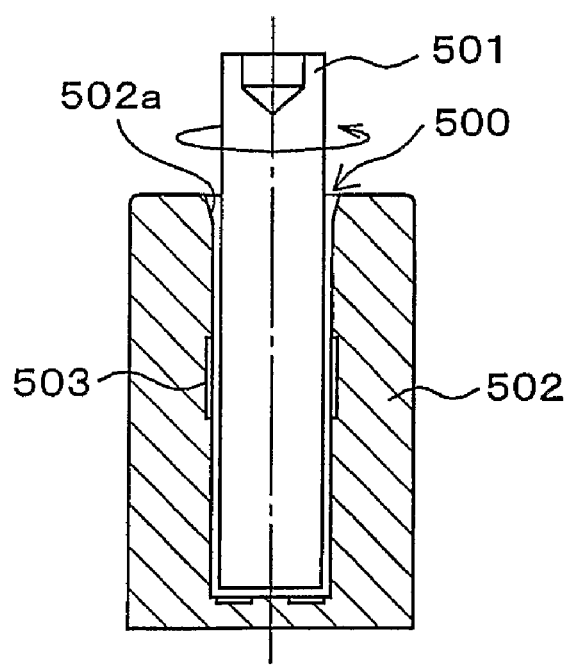
FIG. 16A is an overall view of the fluid dynamic pressure bearing device.
Figure 16B:
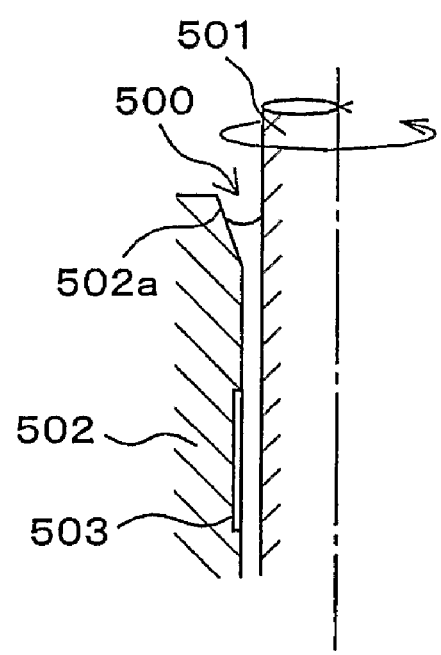
FIG. 16B is a partial enlarged view of the capillary seal portion of FIG. 16A.
Figure 17:
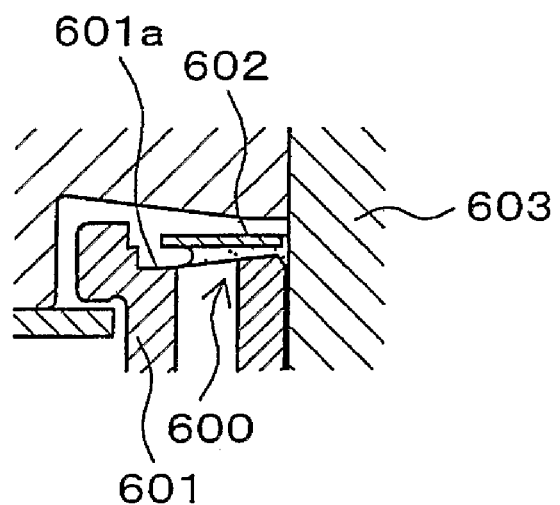
FIG. 17 is a side cross-sectional view showing a schematic structure of another conventional example of a capillary seal portion of a fluid dynamic pressure bearing device.
Figure 18:
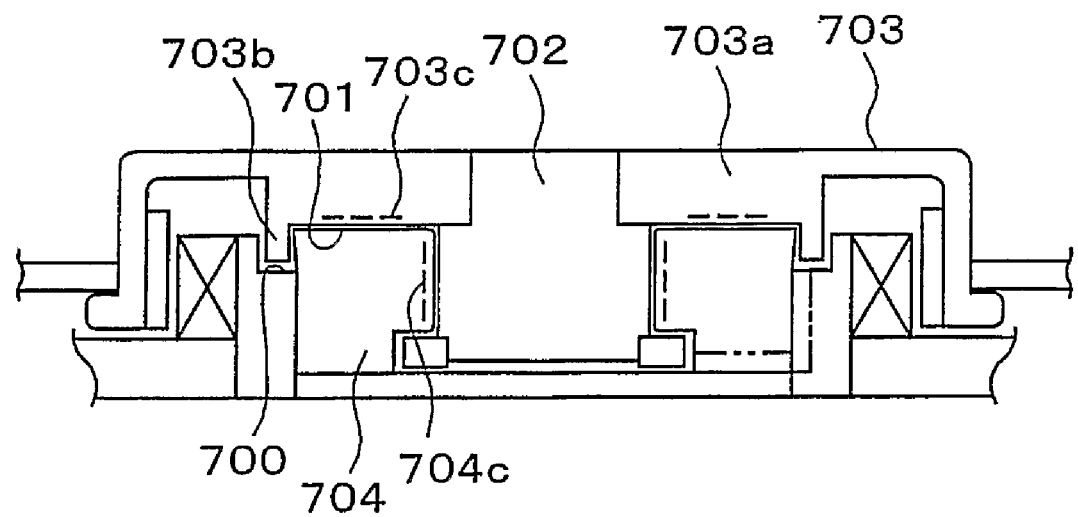
FIG. 18 is a side cross-sectional view showing a schematic structure of another conventional example of a capillary seal portion of a fluid dynamic pressure bearing device.

Using the same bearing device as in prototype embodiment 1, a lesser amount of lubricant than the predetermined amount of prototype embodiment 1 was supplied using the same filling method that was used for prototype embodiment 1 in order to form the liquid surface at the upper end surface of the bearing member, and the state of the liquid surface was observed. The results are shown in FIGS. 14 and 15. FIGS. 14 and 15 are photographs of a top surface of a fluid dynamic pressure bearing device of comparative examples 1, 2 and show a contour formed by the liquid surface of lubricant at the upper end surface of the bearing member. In such a case, if the liquid surface is formed at substantially the same distance from the center of the hole of the bearing member along the entire periphery of the bearing member, that is, if the contour is a shape similar to a circumference, it can be considered that a uniform lubricant liquid surface is formed. In comparative examples 1, 2, a lesser but sufficient amount of lubricant to form a liquid surface at the upper end surface of the bearing member was used. However, as is clear from FIGS. 14 and 15, the liquid surface of the lubricant was unevenly formed, and the contour of the liquid surface seen from the top surface was an irregular shape, and the same shape was not always formed. FIG. 14 shows that the contour of the liquid surface is discontinuous at part of the center hole edge. In FIG. 15, a slightly larger amount of lubricant than in FIG. 14 was used, but the through-hole was not covered by lubricant. Furthermore, bubbles entered part of the center hole edge, and lubricant was discontinuously filled. In this state, when the bearing member is rotated, air enters the lubricant, and lubricant is not sufficiently supplied to the bearing gap; thus, there is a case that the bearing device may be seized.

Thus, compared to comparative examples 1, 2, according to prototype embodiment 1, a stable, uniform lubricant liquid surface was formed, and it was confirmed that lubricant held within the bearing device can be reliably supplied to the radial bearing portion and the thrust bearing portion. Furthermore, in a state in which the liquid surface is formed at the upper end surface of the bearing member when the gaps are filled with lubricant, even if a sufficient amount of lubricant is held within the bearing device, it was confirmed that a state in which lubricant is discontinuously filled is generated, air enters the radial bearing portion and the thrust bearing portion during the rotation, and not enough lubricant is supplied. Therefore, there is a possibility that life duration of the fluid dynamic pressure bearing device expires earlier than expected. Therefore, if lubricant is made to fill the gaps so that the liquid surface is formed in the first capillary seal portion, the life duration becomes longer, and more stable life duration of the bearing can be obtained.

(2) Shock Testing Results for Spindle Motors

Prototype Embodiments 2-19

Shock testing was performed on spindle motors provided with the fluid dynamic pressure bearing device 9 of the ninth embodiment of this invention. According to prototype embodiments 2-10, a shock was applied to the spindle motor of the ninth embodiment of this invention in a stationary state.

According to prototype embodiments 11-19, a shock was applied to the spindle motor of the ninth embodiment of this invention in a rotating state. A lubricant splash-out suppression effect with respect to the shock was confirmed. The shock testing results of prototype embodiments 2-10 are shown in Table 1, and the shock testing results of prototype embodiments 11-19 are shown in Table 2.

TABLE 1

Shock testing results of a stationary spindle motor

| | | Acceleration (G) | | | | |
|---|---|---|---|---|---|---|
| | Position | 800 | 1000 | 1200 | 1400 | 1500 |
| Prototype Embodiment 2 | Facing Upward | OK | OK | OK | OK | OK |
| Prototype Embodiment 3 | Facing Upward | OK | OK | OK | OK | OK |
| Prototype Embodiment 4 | Facing Upward | OK | OK | OK | OK | OK |
| Prototype Embodiment 5 | Facing Downward | OK | OK | OK | OK | OK |
| Prototype Embodiment 6 | Facing Downward | OK | OK | OK | OK | OK |
| Prototype Embodiment 7 | Facing Downward | OK | OK | OK | OK | OK |
| Prototype Embodiment 8 | Facing Sideways | OK | OK | OK | OK | OK |
| Prototype Embodiment 9 | Facing Sideways | OK | OK | OK | OK | OK |
| Prototype Embodiment 10 | Facing Sideways | OK | OK | OK | OK | OK |

TABLE 2

Shock testing results of a rotating spindle motor

| | | Acceleration (G) | | | | |
|---|---|---|---|---|---|---|
| | Position | 800 | 1000 | 1200 | 1400 | 1500 |
| Prototype Embodiment 11 | Facing Upward | OK | OK | OK | OK | Oil leaked |
| Prototype Embodiment 12 | Facing Upward | OK | OK | OK | OK | OK |
| Prototype Embodiment 13 | Facing Upward | OK | OK | OK | OK | OK |
| Prototype Embodiment 14 | Facing Downward | OK | OK | OK | OK | Oil leaked |
| Prototype Embodiment 15 | Facing Downward | OK | OK | OK | OK | OK |
| Prototype Embodiment 16 | Facing Downward | OK | OK | OK | OK | OK |
| Prototype Embodiment 17 | Facing Sideways | OK | OK | OK | OK | Oil leaked |
| Prototype Embodiment 18 | Facing Sideways | OK | OK | OK | OK | OK |
| Prototype Embodiment 19 | Facing Sideways | OK | OK | OK | OK | OK |

In the shock testing, an SM110 type shock-testing machine manufactured by Endevco was used. For the testing condition, three different orientations were used for the assembly orientation of the spindle motor to the above-mentioned testing machine, that is, facing upward, facing downward, and facing sideways as shown in Tables 1 and 2. The assembly orientation "facing upward", "facing downward" and "facing sideways" means that the upper opening portion of the bearing member of the fluid dynamic pressure bearing device faces upward, downward, or sideways, respectively. Furthermore, a shock was applied downward from above, and the shock intensity was measured by the value of the maximum acceleration. The shock intensity was divided into five levels, from 800G to 1500G, and the testing was performed. For the acceleration, a half sine wave was used in which acceleration was increased from zero to the maximum acceleration during an application time of 1 ms, and then returned to zero acceleration. The reason why this testing method was used was that the magnitude of flowing movement of lubricant within the fluid dynamic pressure bearing device depends on the shock intensity and the orientation or the like of the fluid dynamic pressure bearing device with respect to the shock application direction, and this method takes these factors into consideration.

As products to be tested, 18 spindle motors (prototype embodiments 2-19) provided with the fluid dynamic pressure bearing device of the ninth embodiment of this invention were prepared. Nine spindle motors were tested in a stationary state, and nine spindle motors were tested in a rotating state. For each of these states, three of the nine spindle motors were used for each of upward, downward, and sideways assembly orientations. Five acceleration levels were used in succession for the shock testing of the respective products tested.

Furthermore, in prototype embodiments 2-19, the testing was performed according to a procedure of shock (acceleration) application in order from small to large shock (acceleration) application. This is because conditions of position stability of the lubricant with respect to a shock become increasingly severe in this order. Furthermore, the shock testing was performed until acceleration reached the maximum 1500 G, or until oil leakage was found in the tested product.

As is clear from Tables 1 and 2, the testing results show that lubricant leakage was not discovered even at the shock of 1500 G in a stationary state, and lubricant leakage was not discovered even at the shock of 1400 G even in a rotating state. Conventionally, when a magnetic disk device, a CD-ROM device, or the like is installed in a notebook personal computer or a portable terminal, the shock resistance requirement for a spindle motor with a fluid dynamic pressure bearing device is approximately 1000 G, but with respect to the seal structure of the ninth embodiment of this invention, even when the shock is greater than 1000 G, an excellent lubricant splash-out suppression effect is shown. In the tables, "oil leakage" shows that oil leakage was actually confirmed during the testing, and "OK" shows that there was no oil leakage during the testing. Confirmation of oil leakage was performed by visual inspection, using a microscope.

While the invention has been described in connection with specific exemplary embodiments, these embodiments should be viewed as illustrative and not limiting. Various changes, substitutes and improvements are possible within the spirit and scope of the invention.

What is claimed is:

1. A fluid dynamic pressure bearing device, comprising:
   a shaft member;
   a bearing member that supports the shaft member and allows relative rotation between the shaft member and the bearing member;
   a seal member with a top wall, the top wall having a protrusion hole through which an upper end portion of the shaft member protrudes, the seal member being arranged to cover an upper end portion of the bearing member;
   a closure member that closes a lower end portion of the bearing member; and
   a bearing gap including dynamic pressure grooves formed between the shaft member and the bearing member, and between the shaft member and the closure member, respectively; wherein:

a radial dynamic pressure groove is formed in either an outer circumferential surface of the shaft member or an inner circumferential surface of the bearing member, the radial dynamic pressure groove generating a dynamic pressure force that receives a load in a radial direction;

a first thrust dynamic pressure groove is formed in either a downward-facing surface of the shaft member or an upper surface of the closure member, the first thrust dynamic pressure groove generating a dynamic pressure force that receives a load in a thrust direction;

a lubricant holding gap is formed between an upper end surface of the bearing member and an inner surface of the top wall of the seal member;

a first capillary seal portion is formed between an outer circumferential surface of the bearing member and an inner circumferential surface of the seal member, the first capillary seal portion forming a cross-sectionally tapered shape that widens progressing downward;

a second capillary seal portion is formed between the outer circumferential surface of the shaft member and an inner circumferential surface of the protrusion hole; and the bearing gap, the second capillary seal portion, the lubricant holding gap, and the first capillary seal portion are in communication with each other, and occupied by lubricant.

2. The fluid dynamic pressure bearing device as set forth in claim 1, wherein the seal member includes a side wall, and a ventilation hole is formed in the side wall of the seal member, the ventilation hole being positioned below a liquid surface of the lubricant that occupies the first capillary seal portion.

3. The fluid dynamic pressure bearing device as set forth in claim 1, wherein the second capillary seal portion forms a cross-sectionally tapered shape that widens progressing upward.

4. The fluid dynamic pressure bearing device as set forth in claim 1, wherein the lubricant holding gap forms a cross-sectionally tapered shape that widens progressing outward in a radial direction.

5. The fluid dynamic pressure bearing device as set forth in claim 1, wherein an annular protrusion is formed protruding upward from a periphery of the protrusion hole, and extends the second capillary seal portion upward in the axial direction.

6. The fluid dynamic pressure bearing device as set forth in claim 1, wherein:
three or more protrusions are formed on the inner surface of the top wall of the seal member; and
the protrusions contact the upper end surface of the bearing member, thereby accomplishing axial direction positioning of the seal member.

7. The fluid dynamic pressure bearing device as set forth in claim 2, wherein:
circumferential grooves are respectively formed, facing each other, in the outer circumferential surface of the bearing member and the inner circumferential surface of the seal member; and
the circumferential grooves are located below the liquid surface in the first capillary seal portion and above the ventilation hole of the seal member.

8. The fluid dynamic pressure bearing device as set forth in claim 7, wherein an oil repellant agent is coated on the outer circumferential surface of the bearing member and/or on the inner circumferential surface of the seal member, below the circumferential grooves.

9. The fluid dynamic pressure bearing device as set forth in claim 2, wherein the ventilation hole is a notch formed extending downward to a lower end surface of the side wall of the seal member, and serves as a window that enables visual confirmation of a position of the liquid surface of the lubricant.

10. The fluid dynamic pressure bearing device as set forth in claim 1, further comprising:
a hollow case member that has an overall length shorter than an overall length of the bearing member;
wherein the bearing member protrudes from an upper end portion of the case member, and the bearing member is engaged with an inner circumferential surface of the case member.

11. The fluid dynamic pressure bearing device as set forth in claim 10, wherein the seal member is engaged with the outer circumferential surface of the upper end portion of the bearing member, and contacts an upper end surface of the case member thereby accomplishing axial direction positioning of the seal member.

12. The fluid dynamic pressure bearing device as set forth in claim 10, wherein:
a step portion is formed in the outer circumferential surface of the upper end portion of the case member; and
the seal member is engaged with the outer circumferential surface of the upper end portion of the case member, and contacts the step portion thereby accomplishing axial direction positioning of the seal member.

13. The fluid dynamic pressure bearing device as set forth in claim 1, further comprising:
a hollow case member that has an overall length shorter than an overall length of the bearing member; wherein:
the bearing member protrudes from an upper end portion of the case member, and the bearing member is engaged with an inner circumferential surface of the case member;
the seal member is engaged with the outer circumferential surface of the upper end portion of the bearing member;
a first adhesive-retention portion is formed between the outer circumferential surface of the bearing member and the inner circumferential surface of an upper end portion of the case member;
a second adhesive-retention portion is formed between the outer circumferential surface of the bearing member and the inner circumferential surface of a lower end portion of the seal member;
adhesive occupies the first and second retention portions; and
the case member and the seal member are respectively fixed to the bearing member by the adhesive.

14. The fluid dynamic pressure bearing device as set forth in claim 13, wherein:
a circumferential groove is formed in the outer circumferential surface of the bearing member; and
the first adhesive-retention portion is formed between the circumferential groove and the inner circumferential surface of the upper end portion of the case member; and
the second adhesive-retention portion is formed between the circumferential groove and the inner circumferential surface of the lower end portion of the seal member.

15. The fluid dynamic pressure bearing device as set forth in claim 10, wherein the case member is constituted by a tubular portion that is integral with the closure member.

16. The fluid dynamic pressure bearing device as set forth in claim 10, wherein the case member is formed by drawing processing or extrusion processing.

17. The fluid dynamic pressure bearing device as set forth in claim 1, wherein the seal member is formed by drawing processing.

18. The fluid dynamic pressure bearing device as set forth in claim 1, wherein a through-hole passes through the bearing member in an axial direction, the through-hole establishing communication between the bearing gap and the lubricant holding gap.

19. The fluid dynamic pressure bearing device as set forth in claim 1, wherein the shaft member includes a flange portion.

20. The fluid dynamic pressure bearing device as set forth in claim 19, wherein a spacer member is arranged between the bearing member and the closure member, thereby forming an engaging gap that engages with the flange portion.

21. The fluid dynamic pressure bearing device as set forth in claim 19, wherein a second thrust dynamic pressure groove is formed on either a lower end surface of the bearing member or an upper end surface of the flange portion, which face each other, the second thrust dynamic pressure groove generating a dynamic pressure that receives a load in the thrust direction.

22. A spindle motor, comprising:
a base;
a stator that is fixed to the base;
a rotor that is provided with a rotor hub and a rotor magnet that is engaged with the rotor hub and generates a rotation magnetic field in cooperation with the stator, and is arranged so as to be rotatable relative to the base; and
a fluid dynamic pressure bearing device that supports rotation of the rotor; wherein:
the fluid dynamic pressure bearing device is the fluid dynamic pressure bearing device as set forth in claim 1; and
the rotor is attracted by a magnetic force in a direction opposite to the direction of the thrust dynamic pressure generated in the first thrust dynamic pressure groove within the fluid dynamic pressure bearing device.

23. A spindle motor, comprising:
a base;
a stator that is fixed to the base;
a rotor that is provided with a rotor hub and a rotor magnet that is engaged with the rotor hub and generates a rotation magnetic field in cooperation with the stator, and is arranged so as to be rotatable relative to the base; and
a fluid dynamic pressure bearing device that supports rotation of the rotor; wherein:
the fluid dynamic pressure bearing device is the fluid dynamic pressure bearing device as set forth in claim 21.

24. A recording disk drive device, comprising:
a recording disk;
a recording head that writes and/or reads information with respect to the recording disk; and
a spindle motor that rotatingly drives the recording disk, wherein: the spindle motor is the spindle motor as set forth in claim 22.

* * * * *